(12) United States Patent
Ma

(10) Patent No.: US 12,096,800 B2
(45) Date of Patent: Sep. 24, 2024

(54) ELECTRONIC ATOMIZER, AND CONTROL ASSEMBLY AND BATTERY MODULE THEREOF

(71) Applicant: Hangzhou Sungod Semiconductor Co., Ltd., Zhejiang (CN)

(72) Inventor: Meifang Ma, Zhejiang (CN)

(73) Assignee: HANGZHOU SUNGOD SEMICONDUCTOR CO., LTD., Zhejiang (CN)

( * ) Notice: Subject to any disclaimer, the term of this patent is extended or adjusted under 35 U.S.C. 154(b) by 0 days.

(21) Appl. No.: 17/267,404

(22) PCT Filed: Oct. 30, 2020

(86) PCT No.: PCT/CN2020/125343
§ 371 (c)(1),
(2) Date: Feb. 9, 2021

(87) PCT Pub. No.: WO2021/243943
PCT Pub. Date: Dec. 9, 2021

(65) Prior Publication Data
US 2023/0070240 A1    Mar. 9, 2023

(30) Foreign Application Priority Data

May 30, 2020   (CN) .......................... 202010482443.4
May 30, 2020   (CN) .......................... 202010482555.X
(Continued)

(51) Int. Cl.
A24F 40/51    (2020.01)
A24F 40/50    (2020.01)
(Continued)

(52) U.S. Cl.
CPC .............. *A24F 40/51* (2020.01); *A24F 40/50* (2020.01); *A24F 40/95* (2020.01);
(Continued)

(58) Field of Classification Search
CPC .......... A24F 40/51; A24F 40/50; A24F 40/95; A24F 40/53; A24F 40/57; A24F 40/90;
(Continued)

(56) References Cited

U.S. PATENT DOCUMENTS 9,060,388 B2   6/2015  Liu
10,051,889 B2  8/2018  Chen
(Continued)

FOREIGN PATENT DOCUMENTS

CN    202564498 U    11/2012
CN    203618789 U    6/2014
(Continued)

OTHER PUBLICATIONS

English Translation to First CN Office Action for Application No. 202010482443.4.
(Continued)

*Primary Examiner* — Justin M Kratt
(74) *Attorney, Agent, or Firm* — CANTOR COLBURN LLP

(57) ABSTRACT

A control assembly, including: a control circuit, a battery module, and a first interface and a second interface configured to connect the control assembly with an external atomization module. The battery module is provided with a first lead penetrating therethrough. The first interface and a first pin of the control circuit are connected to two electrode terminals of the battery module, respectively. The second interface and a second pin of the control circuit are connected to two terminals of the first lead, respectively. The first pin is an atomization pin, and the second pin is a power (Continued)

pin; or alternatively, the first pin is the power pin, and the second pin is the atomization pin; or alternatively, the first pin is a ground pin, and the second pin is the atomization pin; or alternatively, the first pin is the atomization pin, and the second pin is the ground pin.

11 Claims, 11 Drawing Sheets

(30) Foreign Application Priority Data

May 30, 2020 (CN) .......................... 202020964381.6
May 30, 2020 (CN) .......................... 202020964930.X

(51) Int. Cl.
      *A24F 40/95*       (2020.01)
      *H01M 50/247*       (2021.01)
      *H01M 50/298*       (2021.01)
      *H02J 7/00*       (2006.01)
      *H02J 7/34*       (2006.01)
      *A24F 40/53*       (2020.01)
      *A24F 40/57*       (2020.01)
      *A24F 40/90*       (2020.01)
      *H01M 50/296*       (2021.01)
      *H02J 7/24*       (2006.01)

(52) U.S. Cl.
CPC ....... *H01M 50/247* (2021.01); *H01M 50/298* (2021.01); *H02J 7/0042* (2013.01); *H02J 7/0063* (2013.01); *H02J 7/345* (2013.01); *A24F 40/53* (2020.01); *A24F 40/57* (2020.01); *A24F 40/90* (2020.01); *H01M 50/296* (2021.01); *H02J 7/24* (2013.01); *H02J 7/243* (2020.01); *H02J 2207/10* (2020.01); *H02J 2310/22* (2020.01); *Y02E 60/10* (2013.01)

(58) Field of Classification Search
CPC ............. H01M 50/247; H01M 50/298; H01M 50/296; H02J 7/0042; H02J 7/0063; H02J 7/345; H02J 7/24; H02J 7/243; H02J 2207/10; H02J 2310/22; Y02E 60/10
See application file for complete search history.

(56) References Cited

U.S. PATENT DOCUMENTS

| | | | |
|---|---|---|---|
| 2013/0130070 A1* | 5/2013 | Adachi | ............. H01M 10/4207 |
| | | | 429/61 |
| 2015/0020831 A1 | 1/2015 | Weigensberg et al. | |
| 2015/0027472 A1 | 1/2015 | Amir | |
| 2016/0316822 A1* | 11/2016 | Liu | ........................ A24F 40/50 |
| 2017/0126051 A1 | 5/2017 | Cox et al. | |
| 2017/0143043 A1 | 5/2017 | Liu | |

FOREIGN PATENT DOCUMENTS

| | | |
|---|---|---|
| CN | 104116139 A | 10/2014 |
| CN | 104135877 A | 11/2014 |
| CN | 203952417 U | 11/2014 |
| CN | 206453240 U | 9/2017 |
| CN | 109996373 A | 7/2019 |
| CN | 209882115 U | 12/2019 |
| CN | 111528527 A | 8/2020 |
| CN | 111614142 A | 9/2020 |
| JP | 2005190688 A | 7/2005 |
| JP | 201971363 A | 5/2019 |
| KR | 100770098 A | 10/2007 |

OTHER PUBLICATIONS

First CN Office Action for Application No. 202010482443.4.
Search Report for Application No. 202010482443.4.
Supplementary Search Report for Application No. 202010482443.4.
International Search Report for Application No. PCT/CN2020/125343.

* cited by examiner

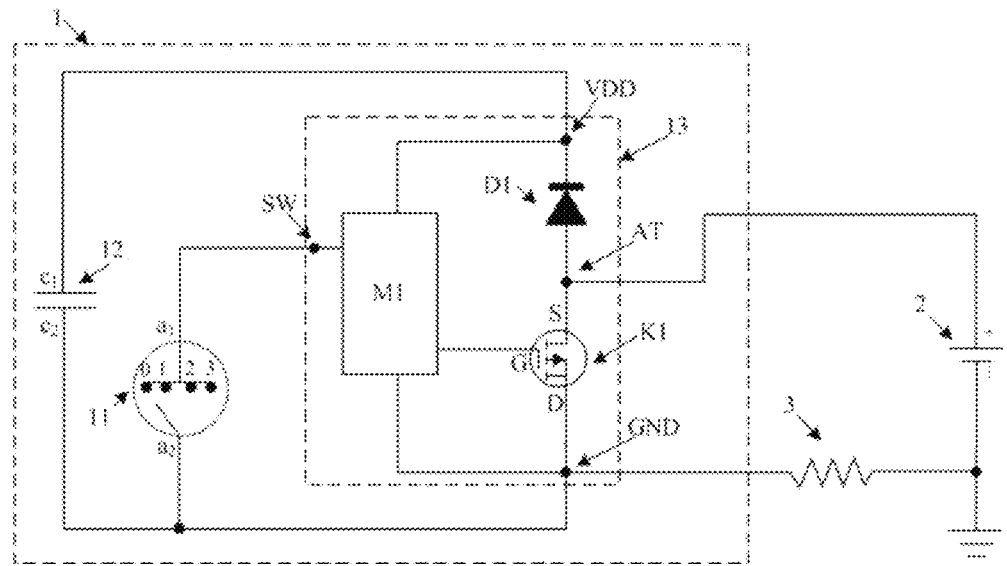
FIG. 15
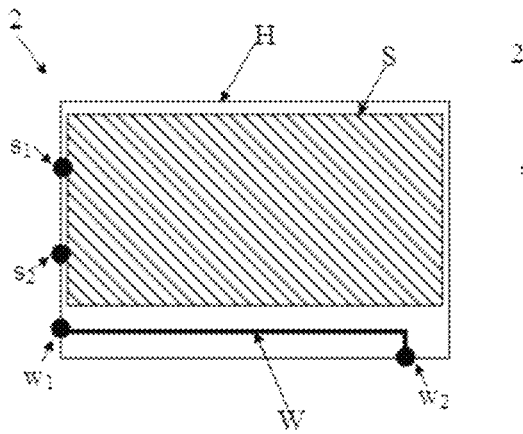 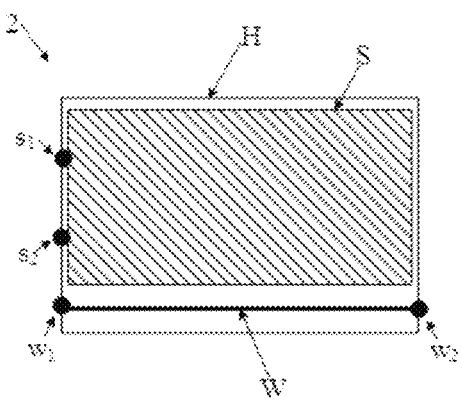
FIG. 16  FIG. 17
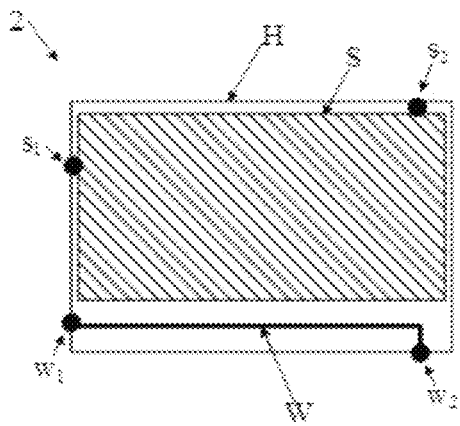 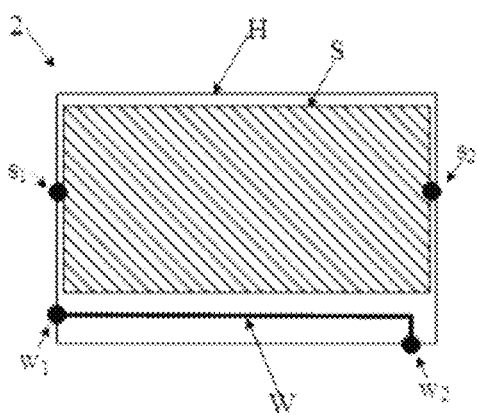
FIG. 18  FIG. 19

ELECTRONIC ATOMIZER, AND CONTROL ASSEMBLY AND BATTERY MODULE THEREOF

CROSS-REFERENCE TO RELATED APPLICATIONS

The present application is a National Stage Appl. filed under 35 USC 371 of International Patent Application No. PCT/CN2020/125343 with an international filing date of Oct. 30, 2020, designating the United States, and further claims the priority of Chinese patent application No. 202010482443.4 titled "electronic atomizer and control assembly" filed at the Chinese Patent Office on May 30, 2020, Chinese patent application No. 202020964381.6 titled "electronic atomizer and control assembly" filed at the Chinese Patent Office on May 30, 2020, Chinese patent application No. 202010482555.X titled "BATTERY MODULE AND electronic atomizer" filed at the Chinese Patent Office on May 30, 2020, and Chinese patent application No. 202020964930.X titled "BATTERY MODULE AND electronic atomizer" filed at the Chinese Patent Office on May 30, 2020, the contents each of which are incorporated herein by reference.

TECHNICAL FIELD

The present application relates to the technical field of electronic atomization, and more particularly to an electronic atomizer, and a control assembly and a battery module thereof.

BACKGROUND

With the gradual increase in people's awareness of health and environmental protection, more and more users begin to choose electronic atomizers (for example, using electronic cigarettes) as a substitute for the conventional cigarettes, which make the market of the electronic atomizer growing. To be competitive in the market, manufactures should pursuit both the product quality and production cost of the electronic atomizer.

At present, as shown in FIG. 1, in the production of the electronic atomizer, it is usually required to weld leads at the three pins (i. e., a power pin VDD), an atomizer pin (AT), and a GND pin) of the control circuit A, in order to connect with a battery S0 and an atomizer R0. As shown in FIG. 2, when assembling the control circuit A and battery S0 (such as a lithium battery), it is usually required to draw multiple leads (such as two leads) from the control circuit A and pass the leads by the side of the battery, so as to connect with the atomizer R0.

However, because a printed circuit board (PCB) of the control circuit has a small area and high density of components, it is impossible to directly weld the leads using a machine. Therefore, the multiple leads need to be welded manually, which results in high labor costs and a greater risk of failure due to manual operations. Therefore, the electronic atomizer of the related art has the problems of high production cost and low product reliability.

Technical Problems

It is an objective of the embodiments of the present application to provide an electronic atomizer and a control assembly thereof, which can solve the problems of high production cost and low product reliability in the electronic atomizers of related art.

It is another objective of the embodiments of the present application to provide a battery module and an electronic atomizer, which can solve the problem that the electronic atomizer of related art has unreasonable circuit wiring, which results in poor reliability of the electronic atomizer.

Technical Solutions

In order to solve the above technical problems, the following technical solutions are adopted:

In a first aspect, an embodiment of the present application provides a control assembly. The control assembly comprises: a control circuit, a battery module, and a first interface and a second interface configured to connect the control assembly with an external atomization module. The battery module is provided with a first lead penetrating therethrough.

The first interface and a first pin of the control circuit are connected to two electrode terminals of the battery module, respectively. The second interface and a second pin of the control circuit are connected to two terminals of the first lead, respectively.

The first pin is an atomization pin, and the second pin is a power pin; or alternatively, the first pin is the power pin, and the second pin is the atomization pin; or alternatively, the first pin is a ground pin, and the second pin is the atomization pin; or alternatively, the first pin is the atomization pin, and the second pin is the ground pin.

The control circuit is configured to control the battery module and the atomization module to form a current pathway, thereby realizing an electronic atomization function.

In a second aspect, an embodiment of the present application provides an electronic atomizer. The electronic atomizer comprises: an atomization module and the control assembly according to any one of possible implementations of the first aspect. The control assembly is connected to one terminal of the atomization module via the first interface, and the control assembly is connected to the other terminal of the atomization module via the second interface.

In a third aspect, an embodiment of the present application provides a battery module. The battery module comprises: a casing, a battery core, and a first lead. The battery core and the first lead are independently arranged inside the casing, and a first terminal and a second terminal of the first lead are arranged at different sides of the casing, respectively. A first electrode terminal of the battery core is configured to be connected with a first pin of an external control circuit, and a second electrode terminal of the battery core is configured to be connected with a first terminal of an external load module. The first terminal of the first lead is configured to be connected with a second pin of the control circuit, and the second terminal of the first lead is configured to be connected with the other terminal of the load module. The control circuit is configured to control the battery module and the load module to form a current pathway to achieve a first function.

In a fourth aspect, an embodiment of the present application provides an electronic atomizer. The electronic atomizer comprises: a control circuit, an atomization module, and the battery module according to the third aspect. The first electrode terminal of the battery core is connected with the first pin of the control circuit, and the second electrode terminal of the battery core is connected with the first terminal of the atomization module. The first terminal of the first lead is connected with the second pin of the control circuit, and the second terminal of the first lead is connected with the other terminal of the atomization module. The control circuit is configured to control the battery module and the load module to form the current pathway to achieve an electronic atomization function.

Beneficial Effects

In the technical solutions provided by the embodiments of the present application, by integrating the control circuit of the electronic atomizer and the battery module as a whole, and by connecting the two pins of the control circuit to the load via the electrode terminal of the battery module and the built-in lead, respectively, the connection with the atomizer can be realized according to practical needs, thereby realizing the electronic atomization function. On the basis of reducing the number of welding leads drawn out of the control circuit from three wires to two wires, the technical solutions provided by the present application further realize the circuit wiring optimization design of the electronic atomizer (for example, removing the long wires inside the cigarette rod), which can not only lower the production cost, but also effectively avoid the risk of failure caused by manual operation, and improve the reliability of the electronic atomizer.

In addition, the technical solutions provided by the present application improve the design of the wiring of the circuit in the electronic atomization, by improving the design of the battery, that is, the leading arrangement within the battery, not only is the long wiring inside the electronic atomizer reduced, thereby avoiding affecting on the battery caused by the leads passing by the side of the battery, but also a battery with a relatively larger capacity can be accommodated within the electronic atomizer, thereby prolonging the battery life of the electronic atomizer. Therefore, the embodiments of the present application can improve the reliability of the electronic atomizer.

BRIEF DESCRIPTION OF THE DRAWINGS

In order to more clearly describe the technical solutions in the embodiments of the present application, the drawings that need to be used in the description of the embodiments or the prior art will be briefly introduced hereinbelow. Obviously, the following described drawings are only some embodiments of the present application. For those skilled in the art, other drawings may be obtained based on these drawings without creative labor.

FIGS. 12-15 are schematic diagrams of circuit connections of an electronic atomizer provided by embodiments of the present application;

FIGS. 16-20 are schematic diagrams of a battery module provided by embodiments of the present application;

DETAILED DESCRIPTION OF THE EMBODIMENTS

Figure 1:
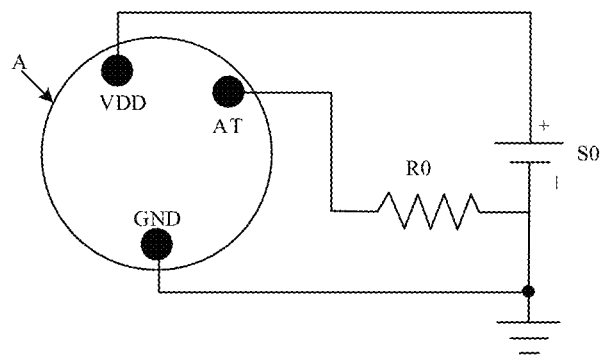
FIGS. 1-2 are schematic diagrams of an electronic atomizer provided by the related art.

In the following description, for the purpose of description, rather than limitation, specific details such as a specific system structure and technology are proposed for a thorough understanding of the embodiments of the present application. However, it should be clear to those skilled in the art that the present application can also be implemented in other embodiments without these specific details. In other cases, detailed descriptions of well-known systems, devices, and circuits are omitted to avoid unnecessary details from obstructing the description of the present application.

At present, in the design of the electronic atomizer (hereafter taking electronic cigarettes as an example) of related arts, it is usually required to weld three connecting leads at the control circuit (including the control chip) to connect with the battery and the atomizer to realize the electronic atomization function. However, because the PCB of the control circuit usually has a small size (for example, the diameter of a circular PCB is about 4 mm~8 mm) and a high density of components, it is impossible to use the machine to directly weld the leads, thus the leads are required to be welded manually. It can be understood that the smaller the number of connecting leads that need to be welded, the lower the risk of failure caused by manual welding. In view of this, the present application proposes to improve the circuit structure of the electronic atomizer to reduce the number of welding leads.

On the one hand, according to the design of the electronic atomizer of the related art, in order to realize the function of the electronic atomization, the atomization pin AT must exist and be connected to the load (i. e., the atomizer). Moreover, the components in the control circuit (especially the control chip) need to be powered by a lithium battery during the entire operation process, therefore, directly disconnecting either one of the power pin VDD and the ground pin GND will cause abnormal operation.

On the other hand, the current standard design of the lithium battery has the positive and negative electrode terminals drawn out from the same side, so multiple (for example, two) solder wires are required to pass by the side of the battery from the control circuit to connect to the interfaces of the load during the assemblage of the whole circuit. However, due to the small size of the electronic atomizer, the wiring will affect the selection of the size of the lithium battery and the overall waterproof performance of the circuit. Therefore, in order to improve the above problems, it is necessary to improve the design of the traditional lithium battery.

Based on the above, in order to ensure that the components (particularly the control chip) in the control circuit can be powered normally during both the non-smoking and smoking condition, the present application improves the overall structure of the electronic atomizer circuit, for example, improving the control chip, in which, one of the leads configured to be in connection with power pin VDD and the ground pin GND is cancelled, thereby reducing the number of the welding leads from three leads to two leads. Further, in view of the situation where the control chip is assembled with the battery through two leads, the battery design can be improved (for example, the lead is arranged inside the battery) to remove the long wiring within the electronic atomizer cigarette rod, thereby improving the reliability of the electronic atomizer.

Embodiments of the present application provide a control assembly and an electronic atomizer comprising the control assembly. The control assembly and the electronic atomizer provided in the present application will be described in detail herein below with reference to the accompanying drawings. It should be noted that since the control assembly and the electronic atomizer described herein below are based on the same concept, the same or similar concepts or processes may not be repeated in some embodiments.

Embodiment 1 Control Assembly

Figure 3:
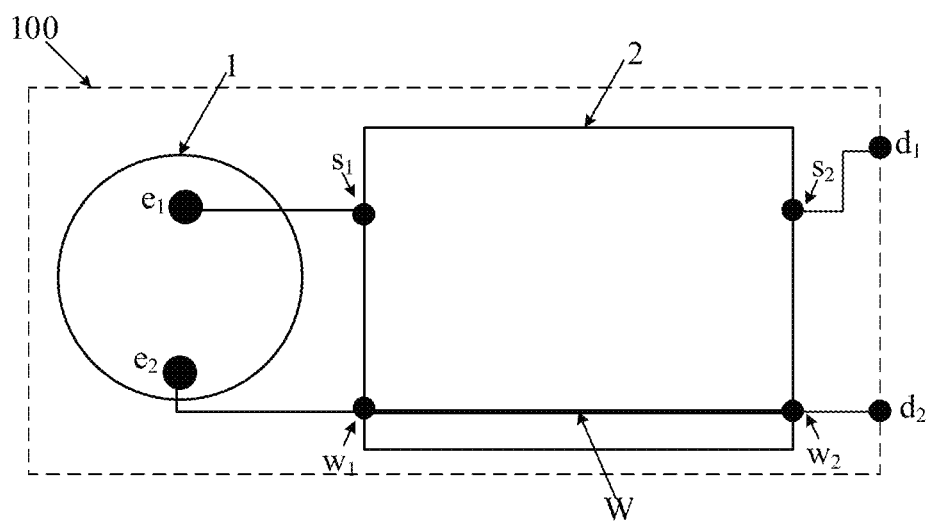
FIG. 3 is a schematic diagram of a control assembly provided by an embodiment of the present application.

FIG. 3 illustrates a circuit diagram of a control assembly provided by an embodiment of the present application. As shown in FIG. 3, the control assembly 100 comprises: a control circuit 1, a battery module 2, and a first interface $d_1$ and a second interface $d_2$ configured to connect the control assembly 100 with an external atomization module. The battery module 2 is provided with a first lead W penetrating therethrough. Two terminals of the first lead W are represented by $w_1$ and $w_2$. Two electrode terminals of the battery module 2 are represented by $s_1$ and $s_2$. It should be noted that for the sake of clarity and conciseness, the figures of the present application (such as FIG. 3, etc.) only schematically depict the simple structure of the battery module 2. It should be understand that the battery module 2 also includes a battery core and a protection circuit.

As shown in FIG. 3, in the control assembly 100, the first interface $d_1$ and a first pin $e_1$ of the control circuit 1 are connected to two electrode terminals of the battery module 2, respectively; and the second interface $d_2$ and a second pin $e_2$ of the control circuit 1 are connected to the two terminals of the first lead W, respectively.

The control circuit 1 is configured to control the battery module 2 and the atomization module to form a current pathway in order to realize the electronic atomization function.

In a possible implementation manner, the first pin $e_1$ may be an atomization pin AT, and the second pin $e_2$ may be a power pin VDD. In another possible implementation manner, the first pin $e_1$ may be the power pin VDD, and the second pin $e_2$ may be the atomization pin AT. In still another possible implementation manner, the first pin $e_1$ may be a ground pin GND, and the second pin $e_2$ may be the atomization pin AT. In still another possible implementation manner, the first pin $e_1$ may be the atomization pin AT, and the second pin $e_2$ may be the ground pin GND.

That is, the control circuit 1 comprises the power pin VDD, the atomization pin AT, and the ground pin GND. Compared with the related art where three welding leads are used to connect the control chip with the battery and the atomizer, in embodiments of the present application, the connection between the control circuit 1 and the battery module 2 is realized by two pins of the control circuit 1, so as to form the control assembly 100 as shown in FIG. 3. The electronic atomization function may be realized further by connection between the control assembly 100 and an external atomization module. In this way, the embodiments of the present application can not only simplify the circuit design and greatly reduce the production cost, but also can remove the long wiring inside the cigarette rod, optimize the internal wiring of the electronic atomizer, and improve the reliability of the electronic atomizer.

Optionally, as shown in FIG. 3, the two electrode terminals $s_1$, $s_2$ of the battery module 2 are disposed at a first side and a second side of the battery module 2. The two terminals $w_1$, $w_2$ of the first lead W are disposed at the first side and the second side of the battery module 2. The first side and the second side are disposed at two opposite sides of the battery module 2. The electrode terminals of the battery module 2 comprise a positive electrode terminal and a negative electrode terminal.

Exemplarily, the electrode terminal $s_1$ of the battery module 2 is a positive electrode terminal, and the electrode terminal $s_2$ is the negative electrode terminal. Or alternatively, the electrode terminal $s_1$ of the battery module 2 is the negative electrode terminal, and the electrode terminal $s_2$ is the positive electrode terminal.

It should be noted that that embodiments of the present application includes, but are not limited to, the above-mentioned arrangement positions of the electrode terminals at the battery module 2. For example, the two electrode terminals of the battery module 2 may be arranged at different sides of the battery module 2. Exemplarily, the two electrode terminals of the battery module 2 may be arranged at two adjacent sides or two opposite sides of the battery module 2, which can be specifically determined according to the practical use requirements, and is not limited in the embodiment of the present application.

It should also be noted that embodiments of the present application include, but are not limited to, the above-mentioned arrangement positions of the two terminals of the first lead W at the battery module 2. For example, the two terminals of the first lead W can be arranged at different sides of the battery module 2. Exemplarily, the two terminals of the first lead W may be arranged at two adjacent sides or two opposite sides of the battery module 2, which can be specifically determined according to the practical use requirements, and is not limited in the embodiments of the present application.

It should be noted that embodiments of the present application includes, but are not limited to, the above-mentioned relative positional relationship between the electrode terminals of the battery module and the two terminals of the first lead. It can be understood that FIG. 3 is a structural schematic diagram of the battery module. In actual implementation, embodiments of the present application include, but are not limited to, the structure as shown in FIG. 3. For facilitating the description, FIG. 3 is taken as an example herein below, and the description is exemplified in conjunction with FIG. 3.

In embodiments of the present application, the above-mentioned power module 2 may be a lithium battery, or may be any other battery that satisfies the practical use requirements, which can be specifically determined according to practical use requirements, and will not be limited in embodiments of the present application. The battery module used in the embodiment of the present application has anew interface structure. Advantages of adopting the above-described battery module having anew interface structure in embodiments of the present application are summarized as follows:

First, embodiments of the present application substitute the original arrangement of the negative and positive electrode interfaces at the same side of the battery with the current arrangement thereof at two different sides of the battery. In conjunction with FIG. 3, it is known that the two-lead connection is adopted, one electrode terminal at one side of the battery module 2 is connected to a control circuit 1 and the other electrode terminal at another side is connected to a load (i. e., an atomizer), therefore, the use of such battery design enables a shorter wiring within the cigarette rod, not only is the reliability of the circuit improved, but also the shorter wiring reduces the heat production of the lead, prolongs the battery life, and improve the user experience.

In addition, the separation of the positive and negative electrode terminals of the battery can improve the reliability of transportation and storage, as well as prevent the risk of short circuit which may be caused by deformation of the battery due to high temperature during use.

Second, embodiments of the application propose to add a lead within the battery and penetrating through the battery (penetrating through two sides of the battery). One terminal of the lead is connected to the control circuit, and the other terminal is connected to the load interface, and the lead is independent of the battery core part, thereby avoiding the situation that the related art is routed by the side of the battery, which results in a small battery accommodation space and the battery may be easily damaged. The battery core part can be consistent with the design in the related art.

This design of routing a lead penetrating through the battery can include the following advantages: first, the wiring within the cigarette rod can be reduced, which is safe and energy-saving; second, the internal wiring method can make the battery accommodated in the cigarette rod have a larger and in turn longer battery life; and third, the use of internal wiring design can make some additional functions of the circuit more convenient and effective (such as waterproof design, etc.).

It should be noted that in the embodiment of the present application, if the specific structure of the control circuit 1 is different, the specific structure of the control assembly 100 is different, that is, the circuit connection relationship between the control circuit 1 and the battery module 2 is different. For example, in the case of one structure type of the control circuit 1, the control circuit 1 can be connected to the battery module 2 through the power pin VDD and the atomization pin AT to form the control assembly 100. In the case of another structure type of control circuit 1, the control circuit 1 can be connected to the battery module 2 through the ground pin GND and the atomization pin AT to form the control assembly 100. Specific circuit connection relationships in the control assembly 100 provided by the embodiments of the present application are exemplified herein below by the first and second implementation manner.

First Implementation Manner

In a first implementation manner, the control circuit 1 can be connected to the battery module 2 via the power pin VDD and the atomization pin AT. The electronic components in the control circuit 1 and connection relationships thereof are exemplified herein below in conjunction with FIG. 4.

Figure 4:
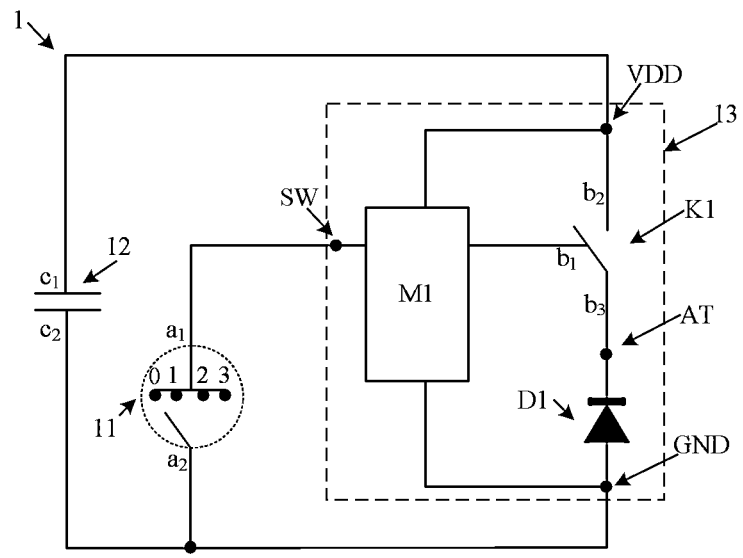
FIG. 4 is a schematic diagram of a control circuit in a control assembly provided by an embodiment of the present application.

As shown in FIG. 4, the control circuit 1 comprises: an airflow sensor 11, a capacitor 12, and a control chip 13. The control chip 13 comprises: a logic controller M1, a unidirectional conduction tube D1, and a switch tube K1. The power pin VDD, the atomization pin AT, and the ground pin GND are pins of the control chip 13.

The logic controller M1 is connected to a first terminal $a_1$ of the airflow sensor 11 and connected to a first terminal $b_1$ of the switch tube K1. The logic controller M1 is connected to a first terminal $c_1$ of the capacitor 12 and a second terminal $b_2$ of the switch tube K1 via the power pin VDD. The logic controller M1 is connected to a positive terminal of the unidirectional conduction tube D1, a second terminal a2 of the airflow sensor 11, and a second terminal $c_2$ of the capacitor 12 via the ground pin GND. A negative terminal of the unidirectional conduction tube D1 is connected to a third terminal $b_3$ of the switch tube K1 via the atomization pin AT.

The power pin VDD and the atomization pin AT of the control chip 13 are configured to be connected to a power supply module and an atomization module, thereby realizing the electronic atomization function. The control circuit is optimized in the present application, such that on the premise of not affecting the use effect of the electronic atomizer, the number of the welding leads in the control circuit of the electronic atomizer is reduced from three (the power pin VDD, the ground pin GND, and the atomization pin AT) to two (i. e., the power pin VDD and the atomization pin AT).

Working principle of the control circuit of the electronic atomizer provided by an embodiment of the present application is described herein below in combination with FIG. 4, by analyzing the flow of the signal flows among different modules in the control circuit of the electronic atomizer.

As shown in FIG. 4, the capacitor 12 and the logic controller M1 can form a current pathway. In a case that a current pathway is formed, the capacitor 12 can supply power to the logic controller M1 in a manner of discharging. It should be noted that the capacitor 12 needs to be pre-charged (for example, charged by the power module), so that when the capacitor 12 and the logic controller M1 form a current pathway, power is supplied to the logic controller M1, that is, in the process of smoking by an user, the capacitor 12 can supply power to the logic controller M1.

It should be noted that, in order to satisfy the normal operation of the electronic atomizer when the three connecting leads are reduced to two connecting leads, particularly the power supply to the control chip during the smoking process by the user, the control circuit is optimized in the embodiment of the present application as follows, additional capacitor and unidirectional conduction tube (such as a diode) has been added in the control circuit, and the capacitor and the unidirectional conduction tube form a bootstrap (power supply) loop. As shown in FIG. 4, when the switch tube K1 is in a conducting state, the capacitor 12, the switch tube K1, and the unidirectional conduction tube D1 can also form a current pathway. In such condition, the capacitor 12 and the unidirectional conduction tube D1 can form a bootstrap circuit. In this way, it can be ensured that the logic controller is normally supplied with power by the capacitor during the smoking process of the user, thereby solving the power supply problem during the smoking process of the user.

Optionally, in the embodiment of the present application, the capacitor 12 may include one or more capacitors, or may include any other devices having charging and discharging functions, which may be specifically determined according to practical use requirements, and may not be limited in this embodiment of the present application.

Optionally, in the embodiment of the present application, the unidirectional conduction tube D1 may include a diode, or may be any other device having a unidirectional conduction function, which can be specifically determined according to practical use requirements, and may not be limited in the embodiment of the present application.

In the embodiment of the present application, the unidirectional conduction tube D1 has the following technical effect: to realize the conduction of the circuit when the user is not smoking, in which condition, the capacitor 12 is charged by the battery module; and to restrict a discharge circuit of the capacitor 12 during the smoking process of the user, in which condition, the control chip 13 is supplied with power completely by the capacitor 12.

Referring again to FIG. 4, the airflow sensor 11 can sense an airflow intensity via a second terminal $a_2$, and then the airflow sensor 11 can convert the airflow intensity into an airflow intensity signal, and then output the airflow intensity signal to the logic controller M1 via the first terminal $a_1$. It can be understood that when the user is smoking through the second terminal $a_2$ of the airflow sensor 11, the airflow sensor 11 can sense the airflow intensity through the second terminal $a_2$.

In the embodiment of the present application, during the user's smoking, the airflow sensor 11 is configured to detect the presence and the intensity of the airflow, and convert the intensity thereof into a level signal and output the level signal to the control chip 13. The airflow sensor 11 may also be called a microphone switch, a pneumatic switch, or a microphone sensor. SW in related figures indicates a switch line where a switch, that is, the airflow sensor 11, is located.

Referring again to FIG. 4, the logic controller M1 is configured to receive the airflow intensity signal output by the first terminal $a_1$ of the airflow sensor 11, control an on-off state of switch tube K1 according to the airflow intensity signal, and control a switching frequency and/or an on-duty ratio of the switch tube K1 according to the airflow intensity signal, whereby adjusting a power of the atomization module.

The on-off state of the switch tube K1 includes a conducting state and a cut-off state. The switching frequency of the switch tube K1 can refer to the number of times the switch tube K1 is conducted within a certain period of time. The on-duty ratio of the switch tube K1 can refer to the ratio of the conduction duration to a total duration in a pulse cycle.

Exemplarily, in a case that a signal intensity of the airflow intensity signal is smaller than a preset value (corresponding to a non-smoking condition), the logic controller M1 is configured to control the switch tube K1 to be in a cut-off state; and in a case that the signal intensity of the airflow intensity signal is greater than or equal to the preset value (corresponding to a smoking condition), the logic controller M1 is configured to control the switch tube K1 to be in a conducting state. The preset value may be set according to practical conditions, which is not limited in this embodiment of the present application.

Optionally, in embodiments of the present application, the switch tube K1 may be a P-type metal oxide semiconductor field effect transistor (MOSFET), or any other transistor that meets practical use requirements, for example, the switch tube K1 can be a junction field effect transistor, which can be specifically set according to practical use requirement thereof, and will not be limited in the embodiment of the present application.

It can be understood that, in the control circuit of the electronic atomizer provided in embodiments of the present application, the switch tube K1 can function as a switch. On one hand, in a case that the signal intensity of the airflow intensity signal is smaller than the preset value, that is, when the user is not smoking, the switch tube K1 is in the cut-off state, which is equivalent to that the switch is in a disconnected state. On the other hand, when the signal intensity of the airflow intensity signal is greater than or equal to the preset value, that is, when the user is smoking, the switch tube K1 is in the conducting state, which is equivalent to that the switch is in the closed state. In summary, the logic controller M1 is able to control the switch tube K1 to be cut-off when the user is not smoking, and to be closed when the user is smoking.

Specifically, the logic controller M1 is configured to receive a smoking signal transmitted from the airflow sensor 11, and process and modulate the smoking signal to drive the switch tube K1 to be conducted. In this case, an atomizing wire in the atomization module is heated to atomize an e-liquid.

In embodiments of the application, the switch tube K1 may be a P-type MOSFET or an N-type MOSFET. The use of different switch tube K1 may result in different connection relationships within the control circuit of the electronic atomizer, which will be explained respectively herein below.

In a case that the switch tube K1 is the P-type MOSFET, the first terminal $b_1$ of the switch tube K1 is a gate, a second terminal $b_2$ of the switch tube K1 is a source, and a third terminal $b_3$ of the switch tube K1 is a drain. Exemplarily, when the signal intensity of the airflow intensity signal is greater than or equal to the preset value, that is, when the user is smoking, the switch tube K1 is in the conducting state (equivalent to that the switch is closed), the switch tube K1 can allow a relatively large current to flow from the second terminal $b_2$ (the source) to the third terminal $b_3$ (the drain).

In a case that the switch tube K1 is the N-type MOSFET, the first terminal $b_1$ of the switch tube K1 is a gate, a second terminal $b_2$ of the switch tube K1 is a drain, and a third terminal $b_3$ of the switch tube K1 is a source. Exemplarily, when the signal intensity of the airflow intensity signal is greater than or equal to the preset value, that is, when the user is smoking, the switch tube K1 is in the conducting state (equivalent to that the switch is closed), the switch tube K1 can allow a relatively large current to flow from the second terminal $b_2$ (the drain) to the third terminal $b_3$ (the source).

In the first implementation manner, by optimizing the control circuit, leads are to be welded at the power pin VDD and the atomization pin AT of the control chip, so as to connect with the power supply module and the atomization module, respectively, in this way, the electronic atomization function can be realized. Compared with the use of three welding leads in the related art, the embodiment of the application can ensure that on the premise of normal working and control of the electronic atomizer, the grounding pin GND of the control chip is not required to be welded with a lead, therefore, the number of the welding leads needing to be drawn is reduced from three leads to two leads. The embodiment of the present application can not only optimize the layout design of the PCB, but also reduce the production cost due to lead welding, and at the same time can effectively avoid the failure risk caused by manual operation.

Based on the control circuit 1 provided by the first implementation manner, the first pin $e_1$ of the control assembly 100 as shown in FIG. 3 can be the atomization pin AT, and the second pin $e_2$ can be the power pin VDD; or alternatively, the first pin $e_1$ can be the power pin VDD, and the second pin $e_2$ can be the atomization pin AT. Specific circuit connection relationships in the control assembly 100 are described in conditions of different pins in the following first mode and second mode.

Figure 5:
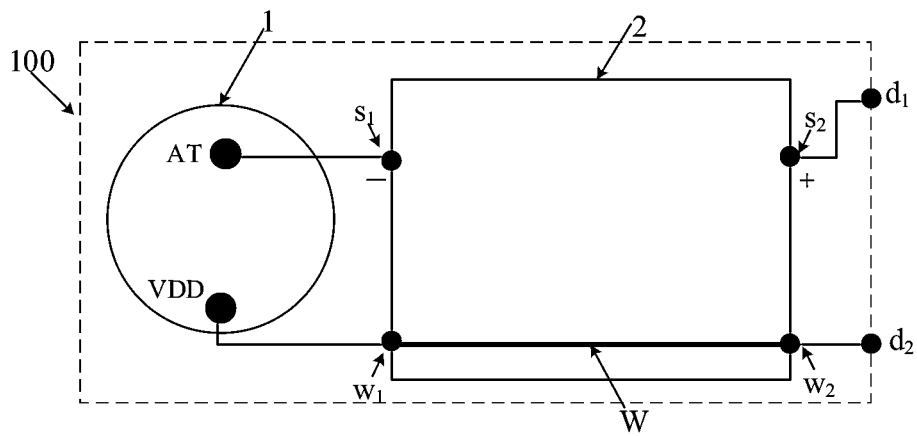
FIGS. 5-6 are schematic diagrams of a control assembly provided by embodiments of the present application.

In the first mode, as shown in FIG. 5, in a case that the first pin $e_1$ is the atomization pin AT and the second pin $e_2$ is the power pin VDD, the first pin $e_1$ (as indicated by AT in FIG. 5) is connected to the first interface $d_1$ via a negative electrode terminal and a positive electrode terminal of the battery module 2 sequentially; and the second pin $e_2$ (as indicated by VDD in FIG. 5) is connected to the second interface $d_2$ via the two terminals $w_1$, $w_2$ of the first lead W sequentially.

Figure 6:
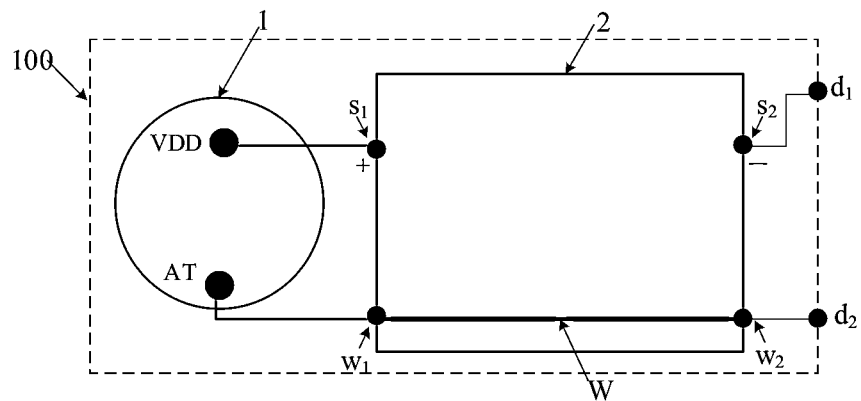

In the second mode, as shown in FIG. 6, in a case that the first pin $e_1$ is the power pin VDD and the second pin $e_2$ is the atomization pin AT, the first pin $e_1$ (as indicated by VDD in FIG. 6) is connected to the first interface $d_1$ via the positive electrode terminal $s_1$ and the negative electrode terminal $s_2$ of the battery module 2 sequentially; and the second pin $e_2$ (as indicated by AT in FIG. 6) is connected to the second interface $d_2$ via the two terminals $w_1$, $w_2$ of the first lead W sequentially.

Second Implementation Manner

In a second implementation manner, the control circuit 1 can be connected with the battery module 2 via the ground pin GND and the atomization pin AT. The electronic components in the control circuit 1 and the connection relationships thereof are exemplified in combination with FIG. 7.

Figure 7:
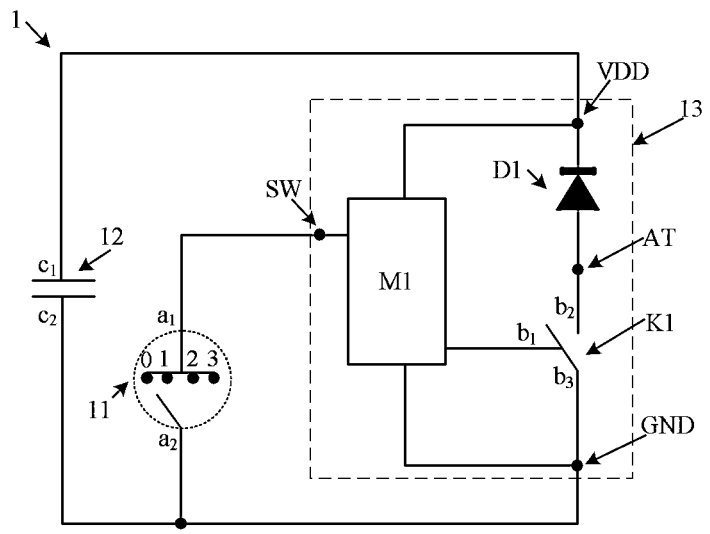
FIG. 7 is a schematic diagram of a control circuit in a control assembly provided by an embodiment of the present application.

As shown in FIG. 7, the control circuit 1 comprises: an airflow sensor 11, a capacitor 12, and a control chip 13. The control chip 13 comprises: a logic controller M1, a unidirectional conduction tube D1, and a switch tube K1. The power pin VDD, the atomization pin AT, and the ground pin GND are pins of the control chip 13.

The logic controller M1 is connected to a first terminal $a_1$ of the airflow sensor 11 and connected to a first terminal $b_1$ of the switch tube K1. The logic controller M1 is connected to a first terminal $c_1$ of the capacitor 12 and a negative terminal of the unidirectional conduction tube D1 via the power pin VDD. A positive terminal of the unidirectional conduction tube D1 is connected to a second terminal $b_2$ of the switch tube K1 via the atomization pin AT. The logic controller M1 is connected to a third terminal $b_3$ of the switch tube K1, a second terminal $a_2$ of the airflow sensor 11, and a second terminal $c_2$ of the capacitor 12 via the ground pin GND.

The ground pin GND and the atomization pin AT of the control chip 13 are configured to be connected to a power supply module and an atomization module, thereby realizing the electronic atomization function. The control circuit is optimized in the present application, such that on the premise of not affecting the use effect of the electronic atomizer, the number of the welding leads in the control circuit of the electronic atomizer is reduced from three (the power pin VDD, the ground pin GND, and the atomization pin AT) to two (i. e., the power pin VDD and the atomization pin AT).

It should be noted that the control circuit in the second implementation manner and the control circuit in the first implementation manner share the same components, but are different in the connection relationship among the components. The description of the control circuit in the second implementation manner may refer to the detailed description of the control circuit in the above first implementation manner, and will not be repeated herein.

In the second implementation manner, by optimizing the control circuit, leads are to be welded at the power pin VDD and the atomization pin AT of the control chip, so as to connect with the power supply module and the atomization module, respectively, in this way, the electronic atomization function can be realized. Compared with the use of three welding leads in the related art, the embodiment of the application can ensure that on the premise of normal working and control of the electronic atomizer, the grounding pin GND of the control chip is not required to be welded with a lead, therefore, the number of the welding leads needing to be drawn is reduced from three leads to two leads. The embodiment of the present application can not only optimize the layout design of the PCB, but also reduce the production cost due to lead welding, and at the same time can effectively avoid the failure risk caused by manual operation, thereby improving the reliability of the electronic atomizer.

In the embodiment of the present application, based on the control circuit 1 provided by the second implementation manner, the first pin $e_1$ of the control assembly 100 as shown in FIG. 3 can be the ground pin GND, and the second pin $e_2$ can be the atomization pin AT; or alternatively, the first pin $e_1$ can be The atomization pin AT, and the second pin $e_2$ can be the ground pin GND. Specific circuit connection relationship in the control assembly 100 is described in conditions of different pins by means of the following third mode and fourth mode.

Figure 8:
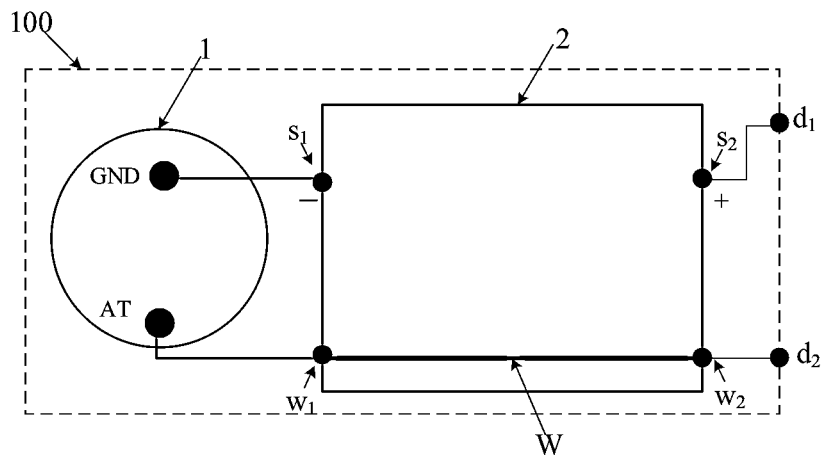
FIGS. 8-9 are schematic diagrams of a control assembly provided by embodiments of the present application.

In the third mode, as shown in FIG. 8, in a case that the first pin $e_1$ is The ground pin GND and the second pin $e_2$ is the atomization pin AT, the first pin $e_1$ (as indicated by GND in FIG. 8) is connected to the first interface $d_1$ via a negative electrode terminal $s_1$ and a positive electrode terminal $s_2$ of the battery module 2 sequentially; and the second pin $e_2$ (as indicated by AT in FIG. 8) is connected to the second interface $d_2$ via the two terminals $w_1$, $w_2$ of the first lead W sequentially.

Figure 9:
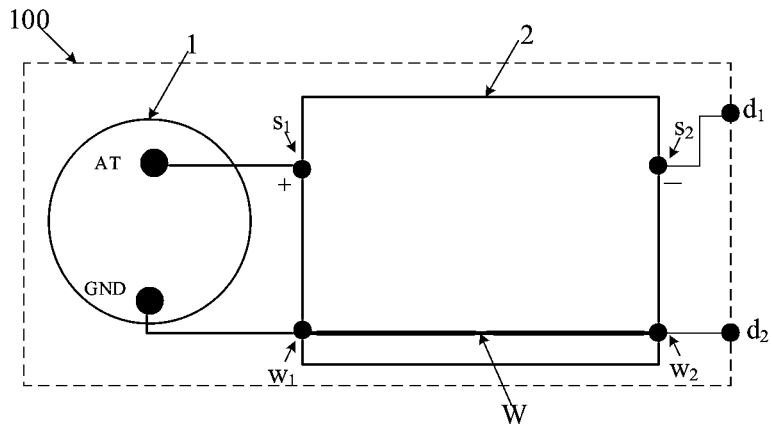

In the fourth mode, as shown in FIG. 9, in a case that the first pin $e_1$ is the atomization pin AT and the second pin $e_2$ is the ground pin GND; the first pin $e_1$ (as indicated by AT in FIG. 9) is connected to the first interface $d_1$ via the positive electrode terminal $s_1$ and the negative electrode terminal $s_2$ of the battery module 2 sequentially; and the second pin $e_2$ (as indicated by GND in FIG. 9) is connected to the second interface $d_2$ via the two terminals $w_1$, $w_2$ of the first lead W sequentially.

Currently, in a conventional design of the electronic atomizer, the flexible wires are required to connect different components, and in the meanwhile, thinner welding leads are required because of the small area of the PCB. However, this will bring the following two disadvantages: the first is that the thinner short leads are relatively difficult to be welded, it is difficult for the machine to operate, and the manual welding efficiency and stability cannot be guaranteed; and the second is that the thinner lead has a larger equivalent resistance value, and the user generates a large amount of heat when smoking normally. On the one hand, it is not necessary to increase the energy consumption of the circuit, on the other hand, severe heating may cause solder joints to be unsoldered, resulting in abnormal circuit operation or even dangerous short-circuiting of the battery.

In view of this, in order to solve the above technical problems, the present application proposes to connect the control circuit and the battery module by using the auxiliary plate, that is, add insertion needles to the pins that need to be soldered on the PCB, and connect them to the auxiliary plate with soldered leads. In addition, the application reduces the number of leads of the control circuit from 3 to 2, which facilitates the accurate positioning of the insertion needles, so that the auxiliary plate can be effectively used to realize the complete machine production for assemblage of the control circuit and the battery, the defects caused by the manual welding are avoided, and the labor production cost is reduced.

Figure 10:
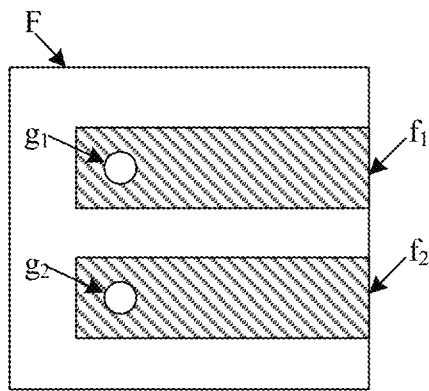
FIG. 10 is a schematic diagram of an auxiliary plate in a control assembly provided by an embodiment of the present application.

Exemplarily, as shown in FIG. 10, the control assembly 100 further comprises an auxiliary plate F, configured to connect the control circuit 1 and the battery module 2 together. The auxiliary plate F comprises a first welding pad $f_1$ and a second welding pad $f_2$.

The first pin $e_1$ is connected to the first welding pad $f_1$, and the first welding pad $f_1$ is connected to one electrode terminal the positive electrode terminal or the negative electrode terminal of the battery module 2 by pressure welding. The second pin $e_2$ is connected to the second welding pad $f_2$, and the second welding pad $f_2$ is connected to one terminal of the first lead W by pressure welding.

Optionally, as shown in FIG. 10, the first welding pad $f_1$ defines therein a first hole $g_1$ configured to fix the first pin $e_1$; and the second welding pad $f_2$ defines therein a second hole $g_2$ configured to fix the second pin $e_2$.

The two circular holes $g_1$ and $g_2$ in the auxiliary plate F correspond to the pins of the control circuit 1 needing to be drawn (such as the ground pin GND and the atomization pin AT). The first welding pad $f_1$ and the second welding pad $f_2$ can be directly connected to the corresponding side of the battery module by pressure welding technology. The larger pressure welding area can ensure the stability of the solder joints and reduce the parasitic impedance caused by the solder joints.

Based on the above design, not only can the connection between the control circuit and the battery module be realized completely in the absence of short leads, but also complete mechanical production can be realized.

In the technical solutions provided by the embodiments of the present application, by integrating the control circuit of the electronic atomizer and the battery module as a whole, and by connecting the two pins of the control circuit to the load via the electrode terminal of the battery module and the built-in lead, respectively, the connection with the atomizer can be realized according to practical needs, thereby realizing the electronic atomization function. On the basis of reducing the number of welding leads drawn out of the control circuit from three wires to two wires, the technical solutions provided by the present application further realize the circuit wiring optimization design of the electronic atomizer (for example, removing the long wires inside the cigarette rod), which can not only lower the production cost, but also effectively avoid the risk of failure caused by manual operation, and improve the reliability of the electronic atomizer.

Embodiment 2 Electronic Atomizer

Figure 11:
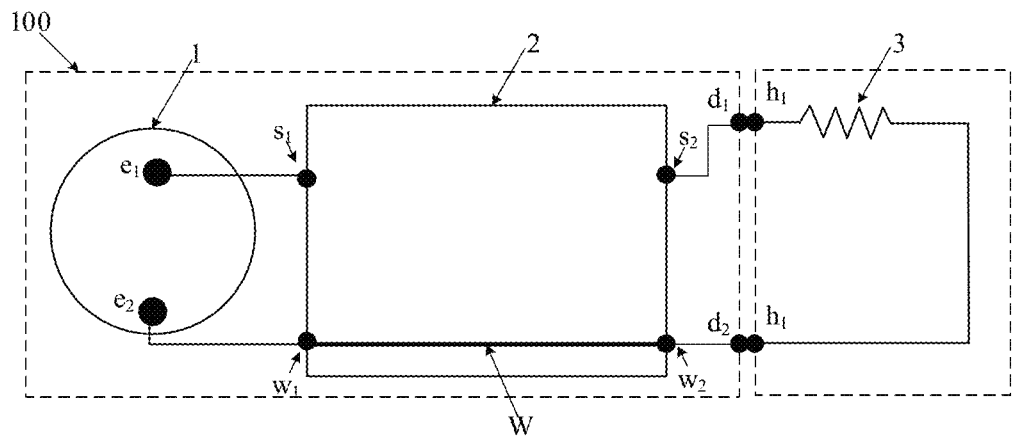
FIG. 11 is a structural schematic diagram of an electronic atomizer provided by an embodiment of the present application.

In combination with FIGS. 3 and 11, an embodiment of the present application further provides an electronic atomizer. The electronic atomizer comprises the control assembly 100 as described in the above first embodiment, and the electronic atomizer further comprises an atomization module 3.

The control assembly 100 is connected to one terminal $h_1$ of the atomization module 3 via the first interface $d_1$, and the control assembly 100 is connected to the other terminal $h_1$ of the atomization module 3 via the second interface $d_2$.

Optionally, in embodiments of the present application, the electronic atomizer may be a heating atomizer, for example, an electronic cigarette, for another example, an inhalation energy bar, or may be any other possible electronic atomizer, which may be specifically determined according to practical use requirements, and will not be limited herein.

For facilitating the description and understanding, the electronic atomizer provided in the embodiment of the application will be exemplified below by taking the electronic atomization being an electronic cigarette as an example.

In the embodiment of the present application, the atomization module 3 (also referred to as a cartridge or atomizer) may include an atomizing wire (also referred to as a load electric heating wire) and an e-liquid. In actual implementation, when current passes through the atomizing wire, the atomizing wire generates heat, and then atomizes the e-liquid.

As shown in FIG. 11, the atomization module 3 includes two contact points (that is, $h_1$ and $h_2$), and the control assembly 100 also includes two contact points (that is, $d_1$ and $d_2$). The atomization module 3 is assembled with the control assembly 100 in a manner of magnetic attraction between contact points, thereby realizing the complete connection of the circuit.

In actual implementation, when the user is smoking, that is, when the switch tube K1 in the control circuit 1 is turned on, the power module 2 and the atomization module 3 can form a current pathway, and when the current passes through the atomizing wire of the atomization module 3, the atomizing wire generates heats, and then atomizes the e-liquid to realize the electronic atomization function. Possible implementation manners of the electronic atomizer in combination with the above-described possible implementation manners of the control assembly will be described herein below.

Figure 12:
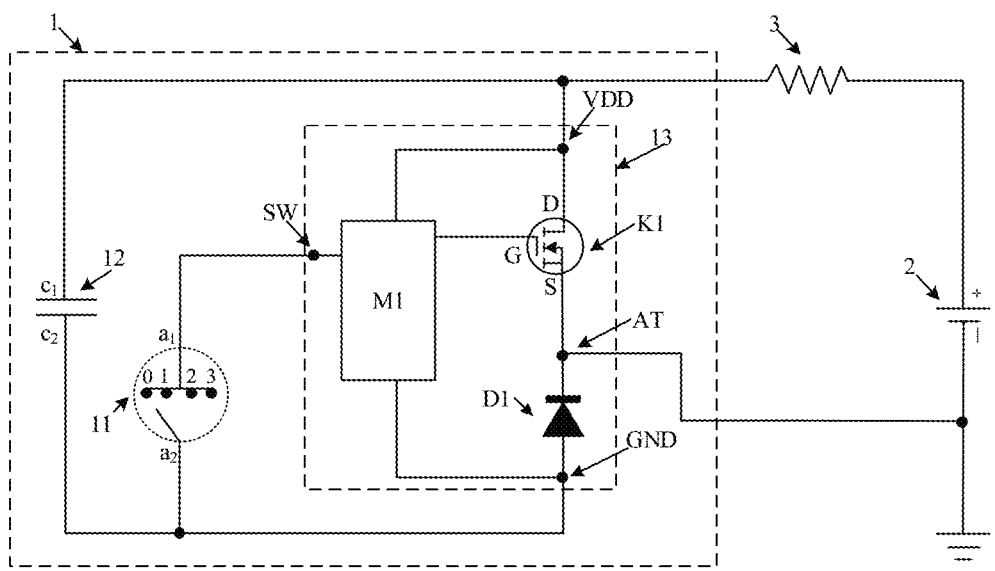

In a possible implementation manner, FIG. 12 is a circuit diagram of an electronic atomizer in combination with FIG. 5, where the switch tube K1 is an N-type MOSFET. When the switch tube K1 is turned on (in such condition, the switch tube K1 allows a relatively large current to flow from the drain D to the source S), the power module 2 and the atomization module 3 can form a current pathway. When the current passes through the atomizing wire, the atomizing wire generates heats, and then atomizes the e-liquid, thereby realizing the electronic atomization function.

Figure 13:
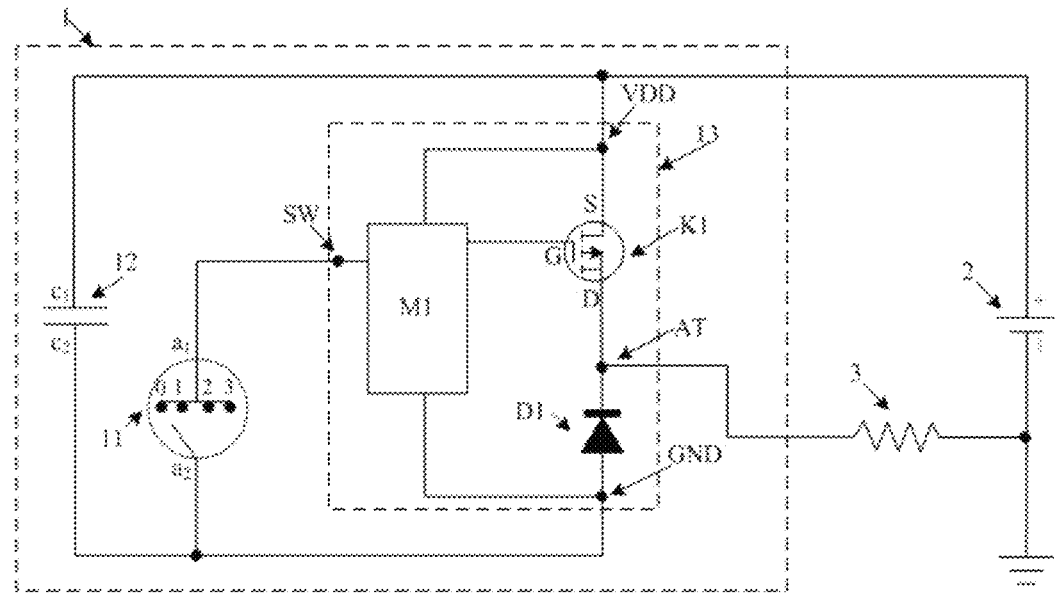

In another possible implementation manner, FIG. 13 is a circuit diagram of an electronic atomizer in combination with FIG. 6, in which the switch tube K1 is a P-type MOSFET. When the switch tube K1 is turned on (in such condition, the switch tube K1 allows a relatively large current to flow from the source S to the drain D), the power module 2 and the atomization module 3 can form a current pathway. When the current passes through the atomizing wire, the atomizing wire generates heats, and then atomizes the e-liquid, thereby realizing the electronic atomization function.

Figure 14:
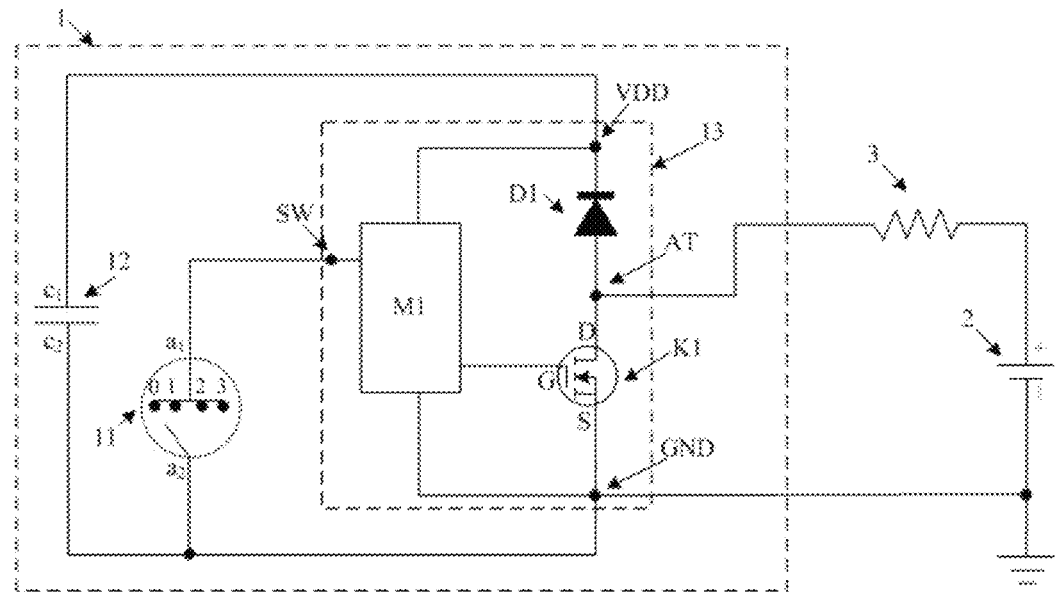

In still another possible implementation manner, FIG. 14 is a circuit diagram of an electronic atomizer in combination with FIG. 8, in which the switch tube K1 is an N-type MOSFET. When the switch tube K1 is turned on (in such condition, the switch tube K1 allows a relatively large current to flow from the drain D to the source S), the power module 2 and the atomization module 3 can form a current pathway. When the current passes through the atomizing wire, the atomizing wire generates heats, and then atomizes the e-liquid, thereby realizing the electronic atomization function.

In still another possible implementation manner, FIG. 15 is a circuit diagram of an electronic atomizer in combination with FIG. 9, in which the switch tube K1 is a P-type MOSFET. When the switch tube K1 is turned on (in such condition, the switch tube K1 allows a relatively large current to flow from the source S to the drain D), the power module 2 and the atomization module 3 can form a current pathway. When the current passes through the atomizing wire, the atomizing wire generates heats, and then atomizes the e-liquid, thereby realizing the electronic atomization function.

Hereinbelow, taken the switch tube K1 being the P-type MOSFET as an example, in conjunction with FIG. 15, the working process of the electronic atomizer is generally described when the battery module 2 and the atomization module 3 are connected to the control circuit 1.

(1) When the user is not smoking, the positive electrode of the battery module 2 is connected to the upper plate of the capacitor 12 via the atomization module 3 and the unidirectional conduction tube D1 of the control circuit 1, and the lower plate of the capacitor 12 is connected to the negative electrode of the battery module 2, so that the capacitor 12 is charged by the battery module 2. In such condition, a voltage difference between the upper and lower plates of the capacitor 12 is approximately equal to the voltage value of the battery module 2. It should be noted that in such condition, the atomizing wire in the atomization module 3 acts as a conducting wire and does not atomize the e-liquid.

In the meanwhile, the battery module 2 supplies power to the logic controller M1 of the control circuit 1, which periodically detects a signal condition on the airflow sensor 11, and waits for the user's instruction to smoke.

(2) When the user is smoking, the airflow sensor 11 detects the airflow, converts the airflow into a level signal, and transmits the level signal to the logic controller M1 in the control chip 13. The switch tube K1 is controlled by the logic controller M1 to close, in which case, the battery module 2 and the atomization module 3 form a current loop, and the atomization module 3 starts to generate heat and atomize the e-liquid, thereby achieving an atomization effect. In this process, the logic controller M1 can control the on-off duration of the atomizing wire through PWM adjustment according to the intensity of the user's smoking, thereby adjusting the atomization amount of the e-liquid.

Although the battery module 2 cannot continue to supply power to the logic controller M1 in the control chip 13 in such condition, due to the existence of the diode D1, after the switch tube K1 is closed, the potential difference between the upper and lower plates of the capacitor 12 is still equal to the voltage of the battery. The capacitor 12 takes over the battery module 2 to supply power to the logic controller M1 of the control core 13, so as to maintain the normal function of the logic controller M1 during smoking.

(3) After the user finishes smoking, the switch tube K1 is disconnected. In such condition, the battery module 2 recharges the logic controller M1 as well as the capacitor 12. This charging process is very fast, and even an interval between two times of smoking action is very short, it can be ensured that the capacitor 12 is fully charged.

Therefore, the embodiments of the present application can realize the normal power supply and operation of the electronic atomizer after the number of welding leads of the control chip is reduced from three leads to two leads.

In a possible implementation manner, the electronic atomizer also comprises a casing and an electric control board. The above-described control assembly 100 is arranged on an electric control board, and the electric control board is accommodated in the casing.

Figure 2:
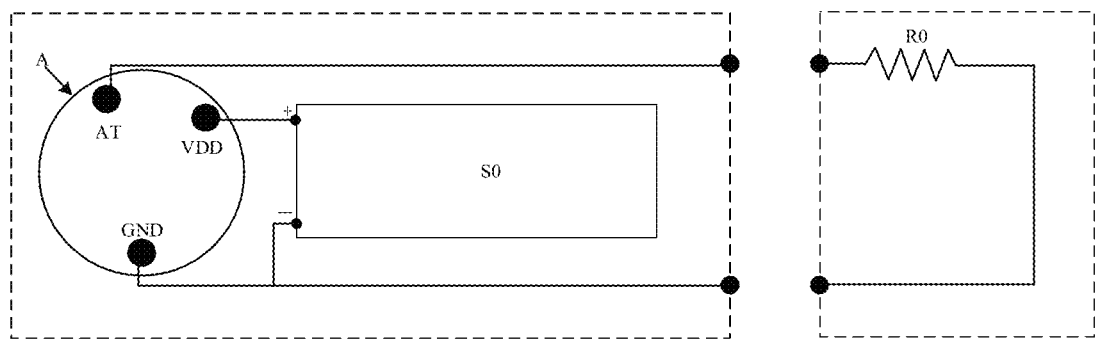

At present, in the design of the electronic atomizer (hereafter taking electronic cigarettes as an example) of related arts, it is generally necessary to weld three connecting leads at the control circuit (including the control chip) in order to connect with the battery (such as a lithium battery) and the atomizer and to realize the electronic atomization function. As shown in FIGS. 1-2, since the positive and negative electrode terminals of the current standard design of the lithium battery are led out from the same side, in assemblage of the overall circuit, multiple (for example, two) welding leads from the control circuit are required to pass through the battery in order to be connected to interfaces of the load. However, due to the small size of the electronic atomizer, the wiring will affect the selection of the size of the lithium battery and the overall waterproof performance of the circuit. Therefore, in order to improve the above problems, the number of welding leads is reduced from three leads to two leads. The design of traditional lithium batteries can be improved.

In embodiments of the present application, in order to ensure that the components (particularly the control chip) in the control circuit can be powered normally during both the non-smoking and smoking condition, the present application improves the overall structure of the electronic atomizer circuit, in which, one of the leads configured to be in connection with power pin VDD and the ground pin GND is cancelled, thereby reducing the number of the welding leads from three leads to two leads. Based on this, the present application proposes to improve the design of the battery (for example, arranging a lead inside the battery) in a case that the number of welding leads is reduced from three leads to two leads, so as to reduce the wiring within the electronic atomizer, and avoid the leading from passing by the battery which would otherwise adversely affect the battery. In this way, the reliability of the electronic atomizer is improved.

An embodiment of the application provides a battery module. The battery module provided by the present application and an electronic atomizer including the battery module will be described in detail herein below with reference to the accompanying drawings.

Embodiment 3 Battery Module

FIG. 16 is a circuit diagram of a battery module provided by an embodiment of the present application. FIG. 17 is a circuit diagram of a battery module provided by another embodiment of the present application. As shown in FIGS. 16-17, a battery module 2 comprises a casing H, a battery core S, and a first lead W. The battery core S may refer to a single electrochemical cell containing positive and negative electrodes. It should be noted that the battery module 2 may also include other components, such as a protection circuit, which can be specifically determined according to practical use requirements, and is not limited in the embodiment of the present application.

The battery core S and the first lead W are independently arranged inside the casing H, and a first terminal $w_1$ and a second terminal $w_2$ of the first lead W are arranged at different sides of the casing H, respectively.

In a possible implementation manner, as shown in FIG. 16, the first terminal $w_1$ and the second terminal $w_2$ of the first lead W are respectively arranged at two adjacent sides of the casing H.

In another possible implementation manner, as shown in FIG. 17, the first terminal $w_1$ and the second terminal $w_2$ of the first lead W are respectively arranged at two opposite sides of the casing H.

It should be noted that, in the embodiment of the application, the first lead being a single lead is taken as an example for an exemplary description. It can be understood that, in actual implementation, the embodiment of the application is not limited to the solution of arranging a single lead within the battery module. It also includes a solution of arranging multiple leads within the battery module, which can be specifically determined according to practical use requirements, and is not limited in the embodiment of the application.

In the embodiment of the present application, by arranging the lead inside the casing of the battery module and making the lead penetrate two ends of the casing, not only is the wiring in the electronic atomizer reduced, but also the lead is avoided from adversely affecting the battery module when being wired outside the battery module. In this way, the reliability of the electronic atomizer is improved.

In the embodiment of the present application, the above battery module may be a lithium battery, or any other batteries that satisfy practical use requirements, which can be specifically determined according to practical use requirements, and are not limited in the embodiment of the present application.

Optionally, in embodiments of the present application, the first electrode terminal $s_1$ and the second electrode terminal $s_2$ of the battery core S are arranged at different sides of the casing H, respectively.

In a possible implementation manner, as shown in FIG. 18, the first electrode terminal $s_1$ and the second electrode terminal $s_2$ of the battery core S may be respectively arranged on two adjacent sides of the casing H.

In another possible implementation manner, as shown in FIG. 19, the first electrode terminal $s_1$ and the second electrode terminal $s_2$ of the battery core S may be respectively arranged on two opposite sides of the casing H.

The first electrode terminal $s_1$ of the battery module 2 is the positive electrode terminal, and the second electrode terminal $s_2$ is the negative electrode terminal. Or alternatively, the first electrode terminal $s_1$ of the battery module 2 is the negative electrode terminal, and the second electrode terminal $s_2$ is the positive electrode terminal. The details can be determined according to practical use requirements, and will not be limited in embodiments of the present application.

In embodiments of the present application, by drawing the positive and negative electrode terminals of the battery out from two sides, the leads in the electronic atomizer are shorter, which can improve the reliability of the circuit, and in the meanwhile, the shorter leads can reduce the heat generated on the leads, prolonging the battery life, and improving the user experience, thereby improving the reliability of the electronic atomizer.

Figure 20:
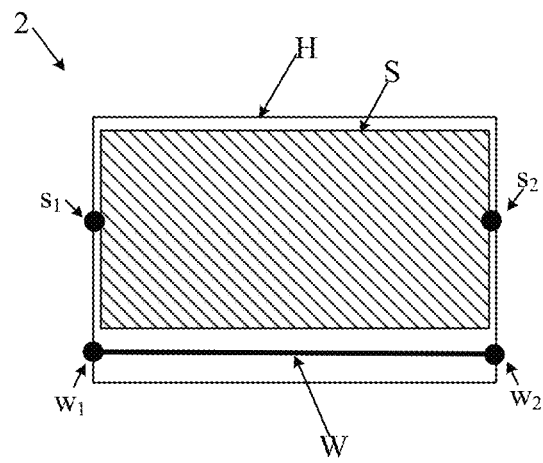

Optionally, in embodiments of the present application, as shown in FIG. 20, the first electrode terminal $s_1$ of the battery core S and the first terminal $w_1$ of the first lead W are arranged at a first side, and the second electrode terminal $s_2$ of the battery core S and the second terminal $w_2$ of the first lead W are both arranged at a second side, and the first side and the second side are arranged at two opposite sides of the casing H.

The circuit connection relationship between the battery module and the external control circuit and load module provided by an embodiment of the present application are exemplarily illustrated herein below, taken the structure of the battery module shown in FIG. 20 as an example.

Figure 21:
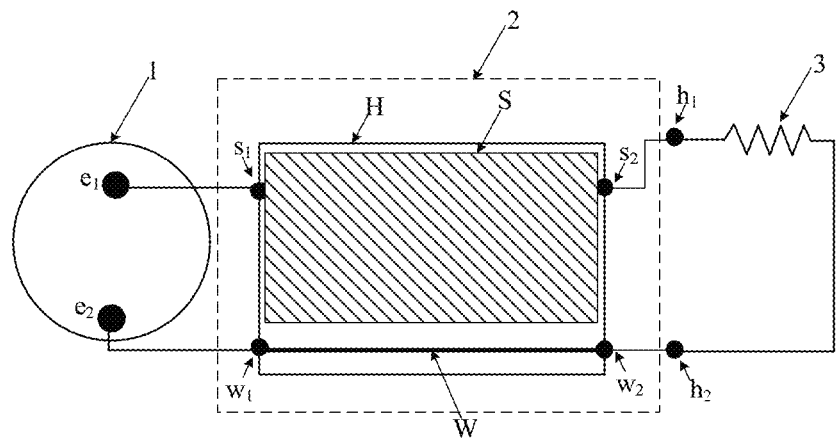
FIGS. 21-25 are schematic diagrams of a circuit connection relationship of a battery module in an electronic atomizer circuit provided by embodiments of the present application.

In embodiments of the present application, as shown in FIGS. 20-21, a first electrode terminal $s_1$ of the battery core S is configured to be connected with a first pin $e_1$ of an external control circuit 1, and a second electrode terminal $s_2$ of the battery core S is configured to be connected with a first terminal $h_1$ of an external load module 3. The first terminal $w_1$ of the first lead W is configured to be connected with a second pin $e_2$ of the control circuit 1, and the second terminal $w_2$ of the first lead W is configured to be connected with the other terminal $h_2$ of the load module 3. The control circuit 1 is configured to control the battery module 2 and the load module 3 to form a current pathway to achieve a first function.

In embodiments of the present application, the load module can be a load configured to realize the first function. For example, the load module 3 can be an atomization module, and the first function can be an electronic atomization function; or alternatively, the load module can be a timer, and the first function can be functions of a watch. The load module and the first function may be specifically determined according to practical use requirements, which are not limited in the embodiments of the present application.

The embodiments of the present application provides an improved battery module, which optimizes the internal wiring by adding one or more internal wires that are not connected to the battery core in the battery module (such as a lithium battery). The applicable scenarios of the battery module provided in the embodiments of the present application include but are not limited to the following scenarios: first, the product is small in size, uses a battery for power supply, and has a strong demand for battery capacity (and product usage time); and second, the product is small in size, and electronic components are designed to be arranged on two sides of the battery, the leads are required to penetrate through the battery for connection the electronic components; and third, the circuit volume is limited, and it is impossible to use a lead with a thicker diameter for welding, but a large current passes through the lead in practical use.

Specific applicable scenarios of the battery module provided by the embodiments of the present application are exemplified by way of examples.

Scenario 1: the battery module can be applied to the electronic atomizer. The electronic atomizer can be a heating atomizer, such as, an electronic cigarette, an inhalation energy bar, or any other possible electronic atomizer, which can be specifically determined according to practical use requirements, and is not limited in the embodiments of the present application.

It should be noted that the above-mentioned electronic cigarette making device can be a conventional electronic cigarette product (that is, the control chip is connected to the battery and the atomizer through three leads), or an improved electronic cigarette product (that is, the control chip is connected to the battery and the atomizer through two leads).

Scenario 2: the battery module can be applied to smart wearable devices, such as smart watches, smart glasses, etc. Taken a smart watch as an example, the smart watch has the following characteristics: (1) the product has a limited volume, uses a battery for power supply, and the battery capacity directly determines the usage time, which is one of its important criteria; (2) the charger and the heart rate sensor are usually arranged at the bottom of the watch, while the display and the interaction are arranged at the top of the watch. Therefore, either the control chip (i. e., the main control board) of the watch is arranged above or below the battery, a lead is required to pass by the battery for connecting corresponding external components.

Therefore, if the battery design provided in the embodiments of the present application is adopted in the design of the smart watch, with one (or more) lead being added within the battery, the following beneficial effects can be achieved: not only the product wiring layout can be optimized and the reliability and aesthetics can be improved, but also the volume of the battery and the standby and usage time can be increased.

Scenario 3: The battery module can be applied to true wireless stereo (TWS) headsets.

The TWS headset can use the battery design provided in the embodiments of the present application, and the TWS headset has the following characteristics: (1) the product has limited volume and uses a battery for power supply, and the battery capacity directly determines the usage time; and (2) the charging and sensing components of the earphone is arranged at the bottom, and the power amplifier is arranged at the top. Therefore, either the control chip (i. e., the main control board) of the earphone is placed above or below the battery, a lead is required to pass by the battery for connecting corresponding external components.

Therefore, if the battery design provided in the embodiments of the present application is adopted in the design of the TWS headset, with one (or more) lead being added within the battery, the following beneficial effects can be achieved: not only the product wiring layout can be optimized and the reliability and aesthetics can be improved, but also the volume of the battery and the standby and usage time can be increased.

Optionally, the battery module provided in the embodiment of the present application is applied to the electronic atomizer, the above-mentioned load module 3 may be the atomization module, and the first function is an electronic atomization function. Among them, the control circuit 1 is used to control the battery module 2 and the atomization module 3 to form a current pathway when the airflow intensity signal is detected to be greater than or equal to the preset value (that is, when the user smokes) to achieve electronic atomization Features.

It can be understood that the battery module provided in the embodiments of the present application can also be applied to other electronic products (the smart wearable devices, TWS headsets as described in the above), which can be specifically determined according to practical use requirements, and not limited to the embodiments of the present application are not limited. Taking the battery module applied to the electronic atomizer as an example, the battery module provided in the embodiment of the present application will be exemplified herein below.

Figure 22:
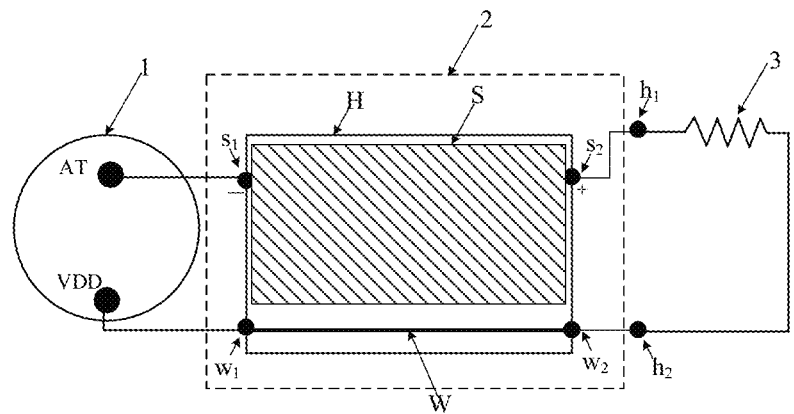

In an implementation manner, as shown in FIG. 22, in a case that the first electrode terminal $s_1$ of the battery core S is a negative electrode terminal and the second electrode terminal $s_2$ of the battery core S is a positive electrode terminal, the first pin $e_1$ can be an atomization pin AT, and the second pin $e_2$ can be a power pin VDD.

With reference to FIG. 22, the negative electrode terminal $s_1$ of the battery core S is configured to connect to the atomization pin AT of the control circuit 1, and the positive electrode terminal $s_2$ of the battery core S is used to connect to one terminal $h_1$ of the atomization module; the first terminal $w_1$ of the first lead W is configured to connect to the power pin VDD of the control circuit 1, and the second terminal $w_2$ of the first lead W is configured to connect to the other terminal $h_2$ of the atomization module.

Figure 23:
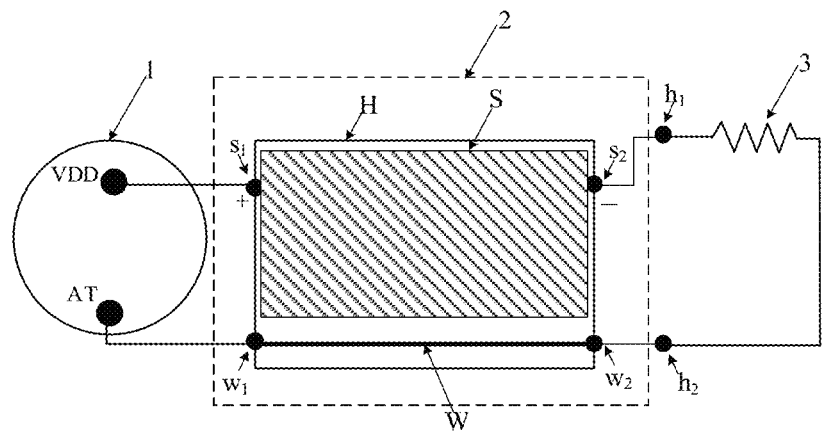

In another implementation manner, as shown in FIG. 23, in a case that the first electrode terminal $s_1$ of the battery core S is the positive electrode terminal and the second electrode terminal $s_2$ of the battery core S is the negative electrode terminal, the first pin $e_1$ can be the power pin VDD and the second pin $e_2$ can be the atomization pin AT.

With reference to FIG. 23, the positive electrode terminal $s_1$ of the battery core S is used to connect to the power pin VDD of the control circuit 1, the negative electrode terminal $s_2$ of the battery core S is used to connect to one terminal $h_1$ of the atomization module. The first terminal $w_1$ of the first lead W is used to connect with the atomization pin AT of the control circuit 1, and the second terminal $w_2$ of the first lead W is used to connect with the other terminal $h_2$ of the atomization module.

Figure 24:
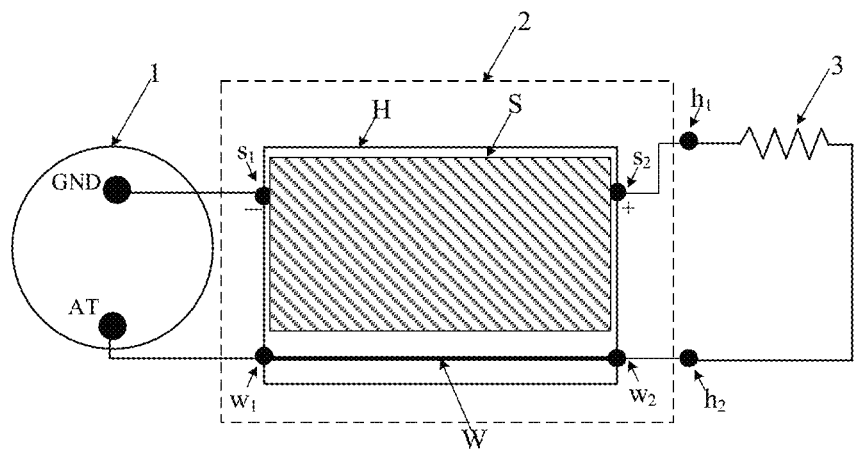

In still another implementation manner, as shown in FIG. 24, in a case that the first electrode terminal $s_1$ of the battery core S is the negative electrode terminal and the second electrode terminal $s_2$ of the battery core S is the positive electrode terminal, the first pin $e_1$ can be the ground pin GND and the second pin $e_2$ can be the atomization pin AT.

With reference to FIG. 24, the negative electrode terminal $s_1$ of the battery core S is used to connect to the ground pin GND of the control circuit 1, the positive electrode terminal $s_2$ of the battery core S is used to connect to one terminal $h_1$ of the atomization module. The first terminal $w_1$ of the first lead W is used to connect with the atomization pin AT of the control circuit 1, and the second terminal $w_2$ of the first lead W is used to connect with the other terminal $h_2$ of the atomization module.

Figure 25:
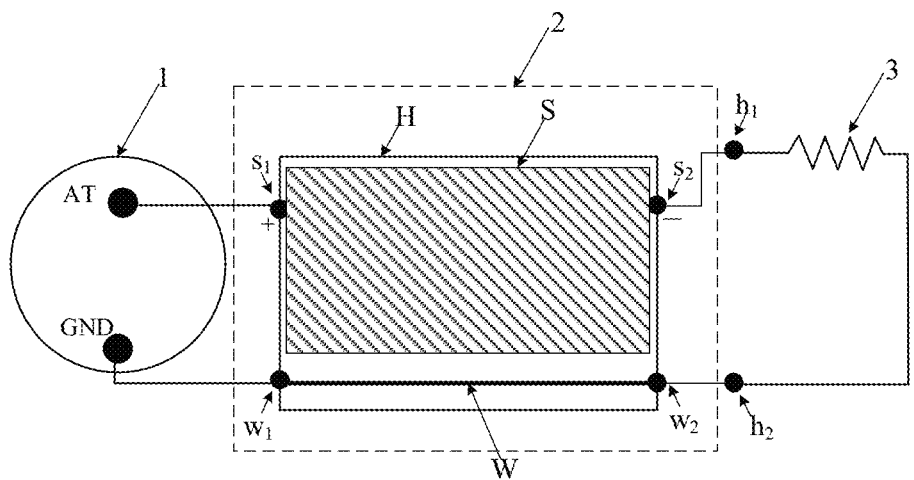

In still another implementation manner, as shown in FIG. 25, in a case that the first electrode terminal $s_1$ of the battery core S is the positive electrode terminal and the second electrode terminal $s_2$ of the battery core S is the negative electrode terminal, the first pin $e_1$ can be the atomization pin AT and the second pin $e_2$ can be the ground pin GND.

With reference to FIG. 25, the positive electrode terminal $s_1$ of the battery core S is used to connect to the atomization pin AT of the control circuit 1, the negative electrode terminal $s_2$ of the battery core S is used to connect to one terminal $h_1$ of the atomization module. The first terminal $w_1$ of the first lead W is used to connect to the ground pin GND of the control circuit 1, and the second terminal $w_2$ of the first lead W is used to connect to the other terminal $h_2$ of the atomization module.

It should be noted that, in the embodiments of the present application, the circuit connection relationship between the battery module 2 and the control circuit 1 is different, and the specific structure of the control circuit 1 is different. Specific circuit connection relationship between the battery module 2 and the control circuit 1 provided in the embodiments of the present application will be exemplified by the following first implementation manner and second implementation manner.

First Implementation Manner

In the first embodiment, the battery module 2 is connected to the control circuit 1 through the power pin VDD and the atomization pin AT of the control circuit 1. The components in the control circuit 1 and their connection relationships are exemplified herein below in combination with FIG. 26.

Figure 26:
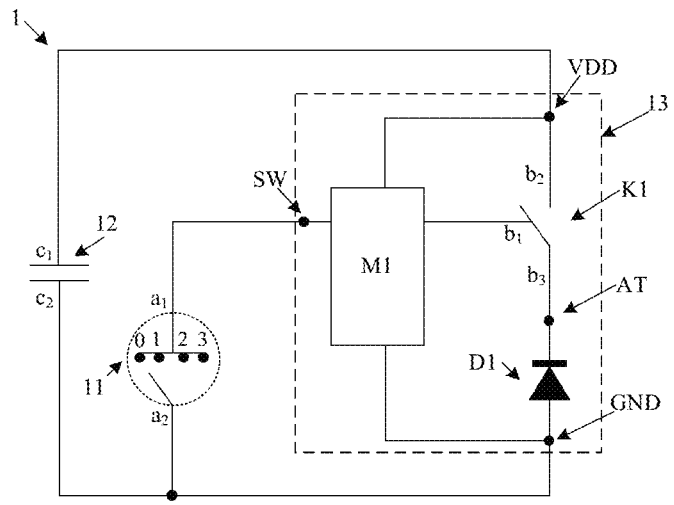
FIGS. 26-27 are schematic diagrams of a control circuit in connection with a battery module provided by embodiments of the present application.

As shown in FIG. 26, the control circuit 1 comprises: an airflow sensor 11, a capacitor 12, and a control chip 13. The control chip 13 comprises: a logic controller M1, a unidirectional conduction tube D1, and a switch tube K1. The power pin VDD, the atomization pin AT, and the ground pin GND can be pins of the control chip 13.

The logic controller M1 is connected to a first terminal $a_1$ of the airflow sensor 11 and connected to a first terminal $b_1$ of the switch tube K1. The logic controller M1 is connected to a first terminal $c_1$ of the capacitor 12 and a negative terminal of the unidirectional conduction tube D1 via the power pin VDD. A positive terminal of the unidirectional conduction tube D1 is connected to a second terminal $b_2$ of the switch tube K1 via the atomization pin AT. The logic controller M1 is connected to a third terminal $b_3$ of the switch tube K1, a second terminal $a_2$ of the airflow sensor 11, and a second terminal $c_2$ of the capacitor 12 via the ground pin GND.

The power pin VDD and the atomization pin AT of the control chip 13 are configured to be connected to a power supply module and an atomization module, thereby realizing the electronic atomization function. The control circuit is optimized in the present application, such that on the premise of not affecting the use effect of the electronic atomizer, the number of the welding leads in the control circuit of the electronic atomizer is reduced from three (the power pin VDD, the ground pin GND, and the atomization pin AT) to two (i. e., the power pin VDD and the atomization pin AT).

Working principle of the control circuit of the electronic atomizer provided by an embodiment of the present application is described herein below in combination with FIG. 26, by analyzing the flow of the signal flows among different modules in the control circuit of the electronic atomizer.

As shown in FIG. 26, the capacitor 12 and the logic controller M1 can form a current pathway. In a case that a current pathway is formed, the capacitor 12 can supply power to the logic controller M1 in a manner of discharging.

It should be noted that the capacitor 12 needs to be pre-charged (for example, charged by the power module), so that when the capacitor 12 and the logic controller M1 form a current pathway, power is supplied to the logic controller M1, that is, in the process of smoking by an user, the capacitor 12 can supply power to the logic controller M1.

It should be noted that, in order to satisfy the normal operation of the electronic atomizer when the three connecting leads are reduced to two connecting leads, particularly the power supply to the control chip during the smoking process by the user, the control circuit is optimized in the embodiment of the present application as follows, additional capacitor and unidirectional conduction tube (such as a diode) has been added in the control circuit, and the capacitor and the unidirectional conduction tube form a bootstrap (power supply) loop. As shown in FIG. 26, when the switch tube K1 is in a conducting state, the capacitor 12, the switch tube K1, and the unidirectional conduction tube D1 can also form a current pathway. In such condition, the capacitor 12 and the unidirectional conduction tube D1 can form a bootstrap circuit. In this way, it can be ensured that the logic controller is normally supplied with power by the capacitor during the smoking process of the user, thereby solving the power supply problem during the smoking process of the user.

Optionally, in the embodiment of the present application, the capacitor 12 may include one or more capacitors, or may include any other devices having charging and discharging functions, which may be specifically determined according to practical use requirements, and may not be limited in this embodiment of the present application.

Optionally, in the embodiment of the present application, the unidirectional conduction tube D1 may include a diode, or may be any other device having a unidirectional conduction function, which can be specifically determined according to practical use requirements, and may not be limited in the embodiment of the present application.

In the embodiment of the present application, the unidirectional conduction tube D1 has the following technical effect: to realize the conduction of the circuit when the user is not smoking, in which condition, the capacitor 12 is charged by the battery module; and to restrict a discharge circuit of the capacitor 12 during the smoking process of the user, in which condition, the control chip 13 is supplied with power completely by the capacitor 12.

Referring again to FIG. 26, the airflow sensor 11 can sense an airflow intensity via a second terminal $a_2$, and then the airflow sensor 11 can convert the airflow intensity into an airflow intensity signal, and then output the airflow intensity signal to the logic controller M1 via the first terminal $a_1$.

It can be understood that when the user is smoking through the second terminal $a_2$ of the airflow sensor 11, the airflow sensor 11 can sense the airflow intensity through the second terminal $a_2$.

In the embodiment of the present application, during the user's smoking, the airflow sensor 11 is configured to detect the presence and the intensity of the airflow, and convert the intensity thereof into a level signal and output the level signal to the control chip 13. The airflow sensor 11 may also be called a microphone switch, a pneumatic switch or a microphone sensor.

Referring again to FIG. 26, the logic controller M1 is configured to receive the airflow intensity signal output by the first terminal $a_1$ of the airflow sensor 11, control an on-off state of switch tube K1 according to the airflow intensity signal, and control a switching frequency and/or an on-duty ratio of the switch tube K1 according to the airflow intensity signal, whereby adjusting a power of the atomization module.

The on-off state of the switch tube K1 includes a conducting state and a cut-off state. The switching frequency of the switch tube K1 can refer to the number of times the switch tube K1 is conducted within a certain period of time. The on-duty ratio of the switch tube K1 can refer to the ratio of the conduction duration to a total duration in a pulse cycle.

Exemplarily, in a case that a signal intensity of the airflow intensity signal is smaller than a preset value (corresponding to a non-smoking condition), the logic controller M1 is configured to control the switch tube K1 to be in a cut-off state; and in a case that the signal intensity of the airflow intensity signal is greater than or equal to the preset value (corresponding to a smoking condition), the logic controller M1 is configured to control the switch tube K1 to be in a conducting state.

The preset value may be set according to practical conditions, which is not limited in this embodiment of the present application.

Optionally, in embodiments of the present application, the switch tube K1 may be the MOSFET, or any other transistor that meets practical use requirements, for example, the switch tube K1 can be a junction field effect transistor, which can be specifically set according to practical use requirement thereof, and will not be limited in the embodiment of the present application.

It can be understood that, in the control circuit of the electronic atomizer provided in embodiments of the present application, the switch tube K1 can function as a switch. On one hand, in a case that the signal intensity of the airflow intensity signal is smaller than the preset value, that is, when the user is not smoking, the switch tube K1 is in the cut-off state, which is equivalent to that the switch is in a disconnected state. On the other hand, when the signal intensity of the airflow intensity signal is greater than or equal to the preset value, that is, when the user is smoking, the switch tube K1 is in the conducting state, which is equivalent to that the switch is in the closed state. In summary, the logic controller M1 is able to control the switch tube K1 to be cut-off when the user is not smoking, and to be closed when the user is smoking.

Specifically, the logic controller M1 is configured to receive a smoking signal transmitted from the airflow sensor 11, and process and modulate the smoking signal to drive the switch tube K1 to be conducted. In this case, an atomizing wire in the atomization module is heated to atomize an e-liquid.

In embodiments of the application, the switch tube K1 may be a P-type MOSFET or an N-type MOSFET. The use of different switch tube K1 may result in different connection relationships within the control circuit of the electronic atomizer, which will be explained respectively herein below.

In a case that the switch tube K1 is the P-type MOSFET, the first terminal $b_1$ of the switch tube K1 is a gate, a second terminal $b_2$ of the switch tube K1 is a source, and a third terminal $b_3$ of the switch tube K1 is a drain.

Exemplarily, when the signal intensity of the airflow intensity signal is greater than or equal to the preset value, that is, when the user is smoking, the switch tube K1 is in the conducting state (equivalent to that the switch is closed), the switch tube K1 can allow a relatively large current to flow from the second terminal $b_2$ (the source) to the third terminal $b_3$ (the drain).

In a case that the switch tube K1 is the N-type MOSFET, the first terminal $b_1$ of the switch tube K1 is a gate, a second terminal $b_2$ of the switch tube K1 is a drain, and a third terminal $b_3$ of the switch tube K1 is a source.

Exemplarily, when the signal intensity of the airflow intensity signal is greater than or equal to the preset value, that is, when the user is smoking, the switch tube K1 is in the conducting state (equivalent to that the switch is closed), the switch tube K1 can allow a relatively large current to flow from the second terminal $b_2$ (the drain) to the third terminal $b_3$ (the source).

In the first implementation manner, leads are to be welded at the power pin VDD and the atomization pin AT of the control chip, so as to connect with the power supply module and the atomization module, respectively, in this way, the electronic atomization function can be realized. Compared with the use of three welding leads in the related art, the embodiment of the application can ensure that on the premise of normal working and control of the electronic atomizer, the grounding pin GND of the control chip is not required to be welded with a lead, therefore, the number of the welding leads needing to be drawn is reduced from three leads to two leads. The embodiment of the present application can not only optimize the layout design of the PCB, but also reduce the production cost due to lead welding, and at the same time can effectively avoid the failure risk caused by manual operation.

Based on the control circuit 1 provided by the first implementation manner, specific circuit connection relationships in the control assembly 100 are described in conditions of different pins in the following first mode and second mode.

In the first mode, referring again to FIG. 22, in a case that the first pin $e_1$ is the atomization pin AT and the second pin $e_2$ is the power pin VDD, the first pin $e_1$ (as indicated by AT in FIG. 22) is connected to one terminal $h_1$ of the atomization module via a negative electrode terminal and a positive electrode terminal of the battery module 2 sequentially; and the second pin $e_2$ (as indicated by VDD in FIG. 22) is connected to the other terminal $h_2$ of the atomization module via the two terminals $w_1$, $w_2$ of the first lead W sequentially.

In the second mode, referring again to FIG. 6, in a case that the first pin $e_1$ is the power pin VDD and the second pin $e_2$ is the atomization pin AT, the first pin $e_1$ (as indicated by VDD in FIG. 23) is connected to one terminal $h_1$ of the atomization module via the positive electrode terminal $s_1$ and the negative electrode terminal $s_2$ of the battery module 2 sequentially; and the second pin $e_2$ (as indicated by AT in FIG. 23) is connected to the other terminal $h_2$ of the atomization module via the two terminals $w_1$, $w_2$ of the first lead W sequentially.

Second Implementation Manner

In a second implementation manner, the battery module 2 is connected to the control circuit 1 via the ground pin GND and the atomization pin AT. The electronic components in the control circuit 1 and the connection relationships thereof are exemplified in combination with FIG. 27.

Figure 27:
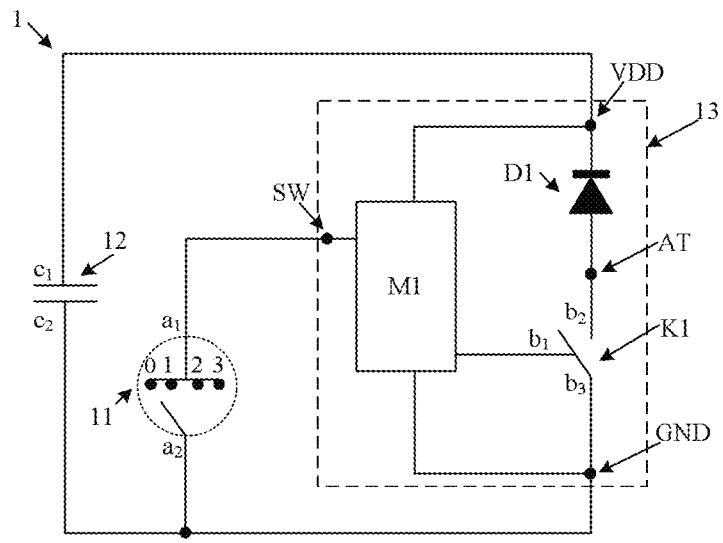

As shown in FIG. 27, the control circuit 1 comprises: an airflow sensor 11, a capacitor 12, and a control chip 13. The control chip 13 comprises: a logic controller M1, a unidirectional conduction tube D1, and a switch tube K1. The power pin VDD, the atomization pin AT, and the ground pin GND are pins of the control chip 13.

The logic controller M1 is connected to a first terminal $a_1$ of the airflow sensor 11 and connected to a first terminal $b_1$ of the switch tube K1. The logic controller M1 is connected to a first terminal $c_1$ of the capacitor 12 and a negative terminal of the unidirectional conduction tube D1 via the power pin VDD. A positive terminal of the unidirectional conduction tube D1 is connected to a second terminal $b_2$ of the switch tube K1 via the atomization pin AT. The logic controller M1 is connected to a third terminal $b_3$ of the switch tube K1, a second terminal $a_2$ of the airflow sensor 11, and a second terminal $c_2$ of the capacitor 12 via the ground pin GND.

The ground pin GND and the atomization pin AT of the control chip 13 are configured to be connected to a power supply module and an atomization module, thereby realizing the electronic atomization function. The control circuit is optimized in the present application, such that on the premise of not affecting the use effect of the electronic atomizer, the number of the welding leads in the control circuit of the electronic atomizer is reduced from three (the power pin VDD, the ground pin GND, and the atomization pin AT) to two (i. e., the power pin VDD and the atomization pin AT).

It should be noted that the control circuit in the second implementation manner and the control circuit in the first implementation manner share the same components, but are different in the connection relationship among the components. The description of the control circuit in the second implementation manner may refer to the detailed description of the control circuit in the above first implementation manner, and will not be repeated herein.

In the second implementation manner, leads are to be welded at the power pin VDD and the atomization pin AT of the control chip, so as to connect with the power supply module and the atomization module, respectively, in this way, the electronic atomization function can be realized. Compared with the use of three welding leads in the related art, the embodiment of the application can ensure that on the premise of normal working and control of the electronic atomizer, the grounding pin GND of the control chip is not required to be welded with a lead, therefore, the number of the welding leads needing to be drawn is reduced from three leads to two leads. The embodiment of the present application can not only optimize the layout design of the PCB, but also reduce the production cost due to lead welding, and at the same time can effectively avoid the failure risk caused by manual operation.

In the embodiment of the present application, based on the control circuit 1 provided by the second implementation manner, specific circuit connection relationship between the battery module 2 and the control circuit 1 is described in conditions of different pins by means of the following third mode and fourth mode.

In the third mode, as shown in FIG. 24, in a case that the first pin $e_1$ is The ground pin GND and the second pin $e_2$ is the atomization pin AT, the first pin $e_1$ (as indicated by GND in FIG. 24) is connected to one terminal $h_1$ of the atomization module via a negative electrode terminal $s_1$ and a positive electrode terminal $s_2$ of the battery module 2 sequentially; and the second pin $e_2$ (as indicated by AT in FIG. 24) is connected to the other terminal $h_2$ of the atomization module via the two terminals $w_1$, $w_2$ of the first lead W sequentially.

In a second mode, as shown in FIG. 25, in a case that the first pin $e_1$ is the atomization pin AT and the second pin $e_2$ is the ground pin GND; the first pin $e_1$ (as indicated by AT in FIG. 25) is connected to one terminal $h_1$ of the atomization module via the positive electrode terminal $s_1$ and the negative electrode terminal $s_2$ of the battery module 2 sequentially; and the second pin $e_2$ (as indicated by GND in FIG. 25) is connected to the other terminal $h_2$ of the atomization module via the two terminals $w_1$, $w_2$ of the first lead W sequentially.

The battery module adopted in the embodiments of the present application has a new interface structure, advantages of adopting the above battery module are summarized herein below:

First, embodiments of the application propose to add a lead within the battery and penetrating through the battery (penetrating through two sides of the battery). One terminal of the lead is connected to the control circuit, and the other terminal is connected to the load interface, and the lead is independent of the battery core part, thereby avoiding the situation that the related art is routed by the side of the battery, which results in a small battery accommodation space and the battery may be easily damaged. The battery core part can be consistent with the design in the related art.

This design of routing a lead penetrating through the battery can include the following advantages: first, the wiring within the electronic atomizer can be reduced, which is safe and energy-saving; second, the internal wiring method can make the battery contained accommodated in the electronic atomizer have a larger and in turn longer battery life; and third, the use of internal wiring design can make some additional functions of the circuit more convenient and effective (such as waterproof design, etc.).

Second, embodiments of the present application substitute the original arrangement of the negative and positive electrode interfaces at the same side of the battery with the current arrangement thereof at two different sides of the battery. The use of such battery design enables a shorter wiring within the cigarette rod, not only is the reliability of the circuit improved, but also the shorter wiring reduces the heat production of the lead, prolongs the battery life, and improve the user experience.

In addition, the separation of the positive and negative electrode terminals of the battery can improve the reliability of transportation and storage, as well as prevent the risk of short circuit which may be caused by deformation of the battery due to high temperature during use.

The technical solution provided by the present application is based on reducing the number of welding leads drawn from the control circuit from three leads to two leads, and further realizes the circuit wiring optimization design in the electronic atomizer by penetrating the leads through the battery, which can remove the long welding leads arranged within the electronic atomizer, simplify the circuit, make the battery accommodated in the electronic atomizer have a larger size and longer battery life, and therefore improve the reliability of the electronic atomizer.

Embodiment 4 Electronic Atomizer

Figure 28:
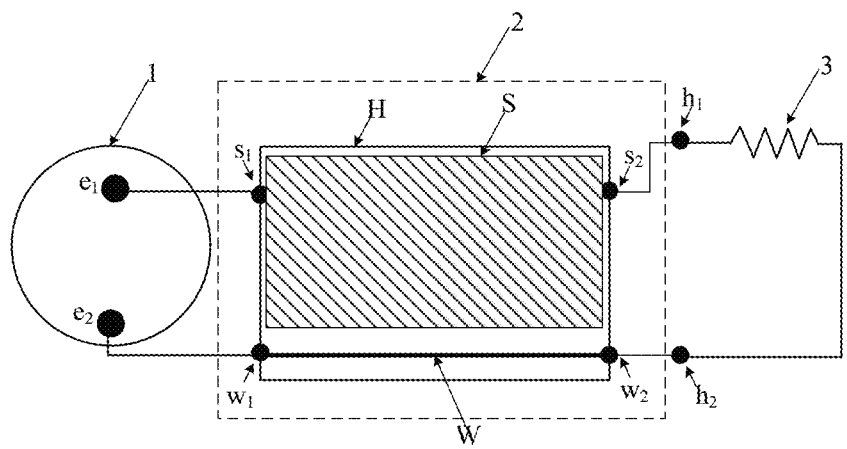
FIG. 28 is a schematic structural diagram of an electronic atomizer provided by an embodiment of the present application.

As shown in FIG. 28, an embodiment of the present application further provides an electronic atomizer. The electronic atomizer comprises: a control circuit 1, an atomization module 3, and the battery module 2 provided by the third embodiment.

The first electrode terminal $s_1$ of the battery core S is connected with the first pin $e_1$ of the control circuit 1, and the second electrode terminal $s_2$ of the battery core S is connected with the first terminal $h_1$ of the atomization module 3. The first terminal $w_1$ of the first lead W is connected with the second pin $e_2$ of the control circuit 1, and the second terminal $w_2$ of the first lead W is connected with the other terminal $h_2$ of the atomization module 3. The control circuit 1 is configured to control the battery module 2 and the load module 3 to form the current pathway to achieve an electronic atomization function.

It should be noted that, in the above electronic atomizer, specific connection relationships of the battery module 2 with the control circuit 1 and the atomization module 3 may refer to the detailed description of the connection relationship of the battery module with the control circuit and the atomization module in the above third embodiment, which will not be repeated herein.

Optionally, in embodiments of the present application, the electronic atomizer may be a heating atomizer, for example, an electronic cigarette, for another example, an inhalation energy bar, or may be any other possible electronic atomizer, which may be specifically determined according to practical use requirements, and will not be limited herein. For facilitating the description and understanding, the electronic atomizer provided in the embodiment of the application will be exemplified below by taking the electronic atomization being an electronic cigarette as an example.

In the embodiment of the present application, the atomization module 3 (also referred to as a cartridge or atomizer) may include an atomizing wire (also referred to as a load electric heating wire) and an e-liquid. In actual implementation, when current passes through the atomizing wire, the atomizing wire generates heat, and then atomizes the e-liquid.

Optionally, in an embodiment of the present application, the battery module 2 and the atomization module 3 can be assembled together in a manner of magnetic attraction between contact points, thereby realizing the complete connection of the circuit. It should be noted that other methods satisfy the use requirement can be utilized in the assemblage, which are not limited herein.

Currently, in a conventional design of the electronic atomizer, the flexible wires are required to connect different components, and in the meanwhile, thinner welding leads are required because of the small area of the PCB. However, this will bring the following two disadvantages: the first is that the thinner short leads are relatively difficult to be welded, it is difficult for the machine to operate, and the manual welding efficiency and stability cannot be guaranteed; and the second is that the thinner lead has a larger equivalent resistance value, and the user generates a large amount of heat when smoking normally. On the one hand, it is not necessary to increase the energy consumption of the circuit, on the other hand, severe heating may cause solder joints to be unsoldered, resulting in abnormal circuit operation or even dangerous short-circuiting of the battery.

In view of this, in order to solve the above technical problems, the present application proposes to connect the control circuit and the battery module by using the auxiliary plate, that is, add insertion needles to the pins that need to be soldered on the PCB, and connect them to the auxiliary plate with soldered leads. In addition, the application reduces the number of leads of the control circuit from 3 to 2, which facilitates the accurate positioning of the insertion needles, so that the auxiliary plate can be effectively used to realize the complete machine production for assemblage of the control circuit and the battery, the defects caused by the manual welding are avoided, and the labor production cost is reduced.

Figure 29:
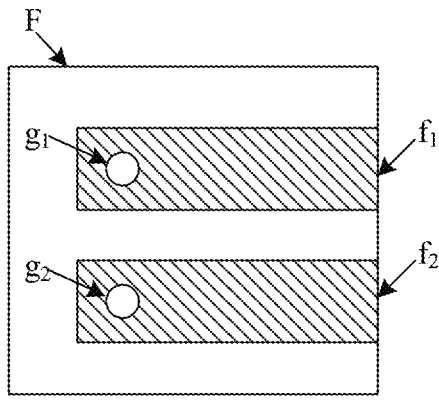
FIG. 29 is a schematic diagram of an auxiliary plate in an electronic atomizer provided by an embodiment of the present application.

Exemplarily, as shown in FIG. 29, the electronic atomizer circuit further comprises an auxiliary plate F, configured to connect the battery module 2 and the control circuit 1 together. The auxiliary plate F comprises a first welding pad $f_1$ and a second welding pad $f_2$. The first pin $e_1$ is connected to the first welding pad $f_1$, and the first welding pad $f_1$ is connected to one electrode terminal (the positive electrode terminal or the negative electrode terminal) of the battery module 2 by pressure welding. The second pin $e_2$ is connected to the second welding pad $f_2$, and the second welding pad $f_2$ is connected to one terminal of the first lead W by pressure welding.

Optionally, as shown in FIG. 29, the first welding pad $f_1$ defines therein a first hole $g_1$ configured to fix the first pin $e_1$. The second welding pad $f_2$ defines therein a second hole $g_2$ configured to fix the second pin $e_2$. The two circular holes $g_1$ and $g_2$ in the auxiliary plate F correspond to the pins of the control circuit 1 needing to be drawn (such as the ground pin GND and the atomization pin AT). The first welding pad $f_1$ and the second welding pad $f_2$ can be directly connected to the corresponding side of the battery module by pressure welding technology. The larger pressure welding area can ensure the stability of the solder joints and reduce the parasitic impedance caused by the solder joints. Based on the above design, not only can the connection between the control circuit and the battery module be realized completely in the absence of short leads, but also complete mechanical production can be realized.

In actual implementation, when the user is smoking, that is, when the switch tube K1 in the control circuit 1 is turned on, the power module 2 and the atomization module 3 can form a current pathway, and when the current passes through the atomizing wire of the atomization module 3, the atomizing wire generates heats, and then atomizes the e-liquid to realize the electronic atomization function. Possible implementation manners of the electronic atomizer in combination with the above-described possible implementation manners of the electronic atomizer will be described herein below.

Figure 30:
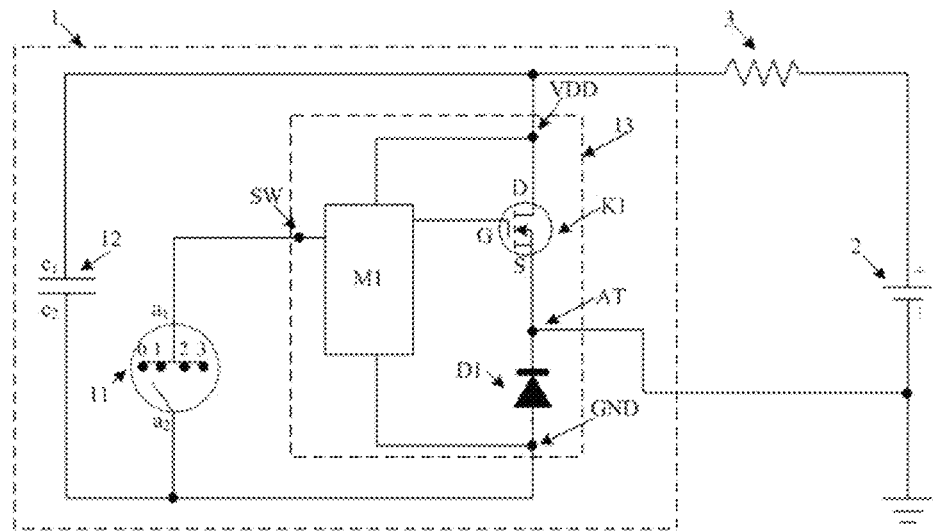
FIGS. 30-33 are schematic diagrams of circuit connections of an electronic atomizer provided by embodiments of the present application.

In a possible implementation manner, FIG. 30 is a circuit diagram of an electronic atomizer in combination with FIG. 22, in which the switch tube K1 is an N-type MOSFET. When the switch tube K1 is turned on (in such condition, the switch tube K1 allows a relatively large current to flow from the drain D to the source S), the power module 2 and the atomization module 3 can form a current pathway. When the current passes through the atomizing wire, the atomizing wire generates heats, and then atomizes the e-liquid, thereby realizing the electronic atomization function.

Figure 31:
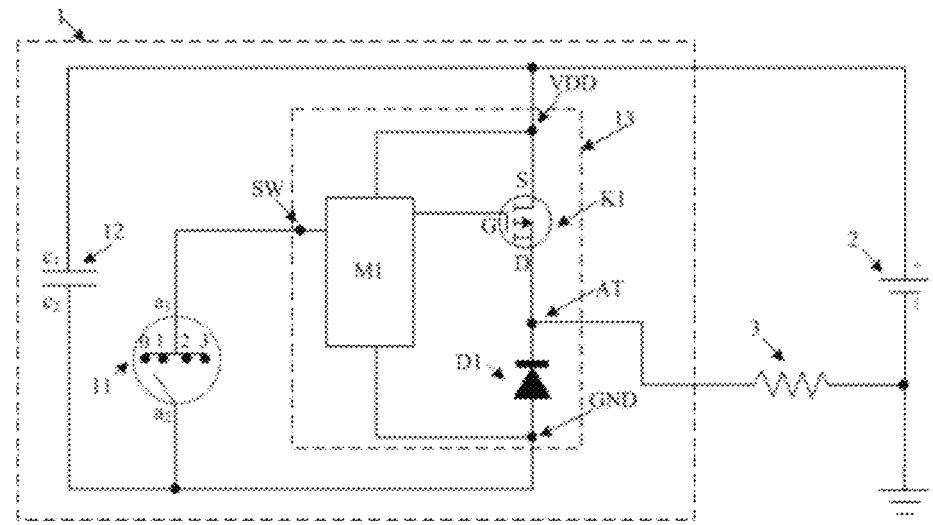

In another possible implementation manner, FIG. 31 is a circuit diagram of an electronic atomizer in combination with FIG. 23, in which the switch tube K1 is a P-type MOSFET. When the switch tube K1 is turned on (in such condition, the switch tube K1 allows a relatively large current to flow from the source S to the drain D), the power module 2 and the atomization module 3 can form a current pathway. When the current passes through the atomizing wire, the atomizing wire generates heats, and then atomizes the e-liquid, thereby realizing the electronic atomization function.

Figure 32:
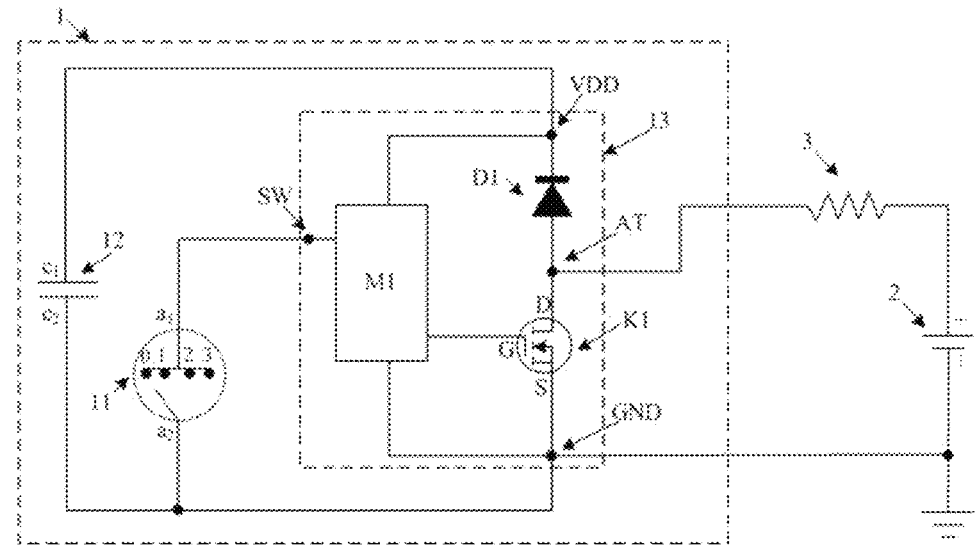

In still another possible implementation manner, FIG. 32 is a circuit diagram of an electronic atomizer in combination with FIG. 24, in which the switch tube K1 is an N-type MOSFET. When the switch tube K1 is turned on (in such condition, the switch tube K1 allows a relatively large current to flow from the drain D to the source S), the power module 2 and the atomization module 3 can form a current pathway. When the current passes through the atomizing wire, the atomizing wire generates heats, and then atomizes the e-liquid, thereby realizing the electronic atomization function.

Figure 33:
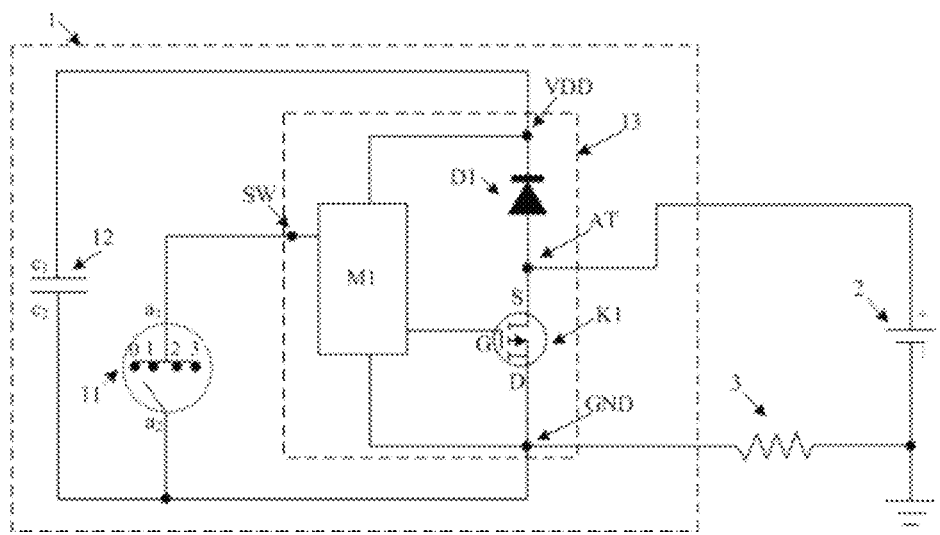

In still another possible implementation manner, FIG. 33 is a circuit diagram of an electronic atomizer in combination with FIG. 25, in which the switch tube K1 is a P-type MOSFET. When the switch tube K1 is turned on (in such condition, the switch tube K1 allows a relatively large current to flow from the source S to the drain D), the power module 2 and the atomization module 3 can form a current pathway. When the current passes through the atomizing wire, the atomizing wire generates heats, and then atomizes the e-liquid, thereby realizing the electronic atomization function.

Hereinbelow, taken the switch tube K1 being the P-type MOSFET as an example, in conjunction with FIG. 33, the working process of the electronic atomizer is generally described when the battery module 2 and the atomization module 3 are connected to the control circuit 1.

(1) When the user is not smoking, the positive electrode of the battery module 2 is connected to the upper plate of the capacitor 12 via the atomization module 3 and the unidirectional conduction tube D1 of the control circuit 1, and the lower plate of the capacitor 12 is connected to the negative electrode of the battery module 2, so that the capacitor 12 is charged by the battery module 2. In such condition, a voltage difference between the upper and lower plates of the capacitor 12 is approximately equal to the voltage value of the battery module 2. It should be noted that in such condition, the atomizing wire in the atomization module 3 acts as a conducting wire and does not atomize the e-liquid. In the meanwhile, the battery module 2 supplies power to the logic controller M1 of the control circuit 1, which periodically detects a signal condition on the airflow sensor 11, and waits for the user's instruction to smoke.

(2) When the user is smoking, the airflow sensor 11 detects the airflow, converts the airflow into a level signal, and transmits the level signal to the logic controller M1 in the control chip 13. The switch tube K1 is controlled by the logic controller M1 to close, in which case, the battery module 2 and the atomization module 3 form a current loop, and the atomization module 3 starts to generate heat and atomize the e-liquid, thereby achieving an atomization effect. In this process, the logic controller M1 can control the on-off duration of the atomizing wire through PWM adjustment according to the intensity of the user's smoking, thereby adjusting the atomization amount of the e-liquid.

Although the battery module 2 cannot continue to supply power to the logic controller M1 in the control chip 13 in such condition, due to the existence of the diode D1, after the switch tube K1 is closed, the potential difference between the upper and lower plates of the capacitor 12 is still equal to the voltage of the battery. The capacitor 12 takes over the battery module 2 to supply power to the logic controller M1 of the control core 13, so as to maintain the normal function of the logic controller M1 during smoking.

(3) After the user finishes smoking, the switch tube K1 is disconnected. In such condition, the battery module 2 recharges the logic controller M1 as well as the capacitor 12. This charging process is very fast, and even an interval between two times of smoking action is very short, it can be ensured that the capacitor 12 is fully charged.

Therefore, the embodiments of the present application can realize the normal power supply and operation of the electronic atomizer after the number of welding leads of the control chip is reduced from three leads to two leads.

In the embodiments of the present application, the design of the wiring of the circuit in the electronic atomization can be optimized by improving the design of the battery, that is, by arranging the leading within the battery, not only is the long wiring inside the electronic atomizer removed, thereby avoiding the effects on the battery caused by the leads passing by the side of the battery, but also a battery with a relatively larger capacity can be accommodated within the electronic atomizer, thereby prolonging the battery life of the electronic atomizer. Therefore, the embodiments of the present application can improve the reliability of the electronic atomizer.

In the above-mentioned embodiments, the description of each embodiment has its own emphasis. For parts that are not detailed or recorded in one embodiment, reference may be made to related descriptions of other embodiments.

Those skilled in the art may realize that the units and algorithm steps exemplified in embodiments of the description can be implemented by electronic hardware or a combination of computer software and electronic hardware. Whether these functions are executed by hardware or software depends on the specific application and design constraint conditions of the technical solution. Professionals and technicians can use different methods for each specific application to implement the described functions, but such implementation should not be considered beyond the scope of the present application.

In the embodiments provided in the present application, it should be understood that the disclosed apparatus/electronic device and method may be implemented in other ways. For example, the apparatus/electronic device embodiments described above are only illustrative. For example, the division of modules or units is only a logical function division. In actual implementation, other division methods may be adopted, for example, some units, or components may be combined or integrated into another system, and some features may be omitted or not implemented. In addition, the displayed or discussed mutual coupling or direct coupling or communication connection may be indirect coupling or communication connection through some interfaces, devices, or units, and may also be in electrical, mechanical, or other forms.

The units described in the above as separate components may be or may not be physically separated, and the components displayed as units may be or may not be physical units, that is, they may be located in one place, or they may be distributed on multiple network units. Some or all of the units may be selected according to actual needs to achieve the objectives of the solutions of the embodiments.

It should be understood that when used in the specification and appended claims of the present application, the term "comprising" indicates the existence of the described features, wholes, steps, operations, elements, and/or components, but does not exclude the existence or addition of one or more other features, wholes, steps, operations, elements, components, and/or collections thereof.

It should also be understood that the term "and/or" used in the specification of the present application and the appended claims refers to any combination of one or more of the associated listed items and all possible combinations thereof, and includes these combinations.

As used in the description of the present application and the appended claims, the term "if" can be interpreted as "when" or "once" or "in response to determination" or "in response to detection". Similarly, the phrase "if [described condition or event] being determined" or "if [described condition or event] being detected" can be interpreted as meaning "once determined" or "in response to determination" or "once [described condition or event] being detected", or "in response to detection of [condition or event described]" according to the context.

In addition, in the description of the specification of the present application and the appended claims, the terms "first", "second", "third", etc. are only used to distinguish the description, and cannot be understood as indicating or implying relative importance.

The reference to "one embodiment" or "some embodiments" described in the specification of the present application means that one or more embodiments of the present application include a specific feature, structure, or characteristic described in combination with the one or more embodiment. Therefore, the words "in one embodiment", "in some embodiments", "in some other embodiments", "in still some other embodiments", etc. appearing in different places in this specification are not necessarily refer to the same embodiments, but mean "one or more but not all embodiments", unless otherwise specifically emphasized. The terms "including", "comprising", "having" and their variations all mean "including but not limited to", unless otherwise specifically emphasized in other ways.

The above-mentioned embodiments are only used to illustrate, but not to limit, the technical solutions of the present application. Although the present application has been described in detail with reference to the foregoing embodiments, those skilled in the art should understand that modifications may be made to the technical solutions described in the foregoing embodiments, or equivalent replacement may be made to part of the technical features. However, such modifications or replacements do not make the essence of the corresponding technical solutions deviate from the spirit and scope of the technical solutions of the embodiments of the application, and therefore should be included in within the protection scope of the present application.

What is claimed is:

1. A control assembly, comprising: a control circuit, a battery module, and a first interface and a second interface; the first interface and the second interface being configured to connect the control assembly with an external atomization module; wherein
   the battery module is provided with a first lead penetrating therethrough;

the first interface and a first pin of the control circuit are connected to two electrode terminals of the battery module, respectively; and the second interface and a second pin of the control circuit are connected to two terminals of the first lead, respectively;

the first pin is an atomization pin, and the second pin is a power pin; or alternatively, the first pin is the power pin, and the second pin is the atomization pin; or alternatively, the first pin is a ground pin, and the second pin is the atomization pin; or alternatively, the first pin is the atomization pin, and the second pin is the ground pin;

the control circuit comprises: an airflow sensor, a capacitor, and a control chip; the control chip comprises: a logic controller, a unidirectional conduction tube, a switch tube, a power pin, an atomization pin, and a ground pin;

the logic controller is connected to a first terminal of the airflow sensor and connected to a first terminal of the switch tube; the logic controller is connected to a first terminal of the capacitor and a second terminal of the switch tube via the power pin; the logic controller is connected to a positive terminal of the unidirectional conduction tube, a second terminal of the airflow sensor, and a second terminal of the capacitor via the ground pin; and a negative terminal of the unidirectional conduction tube is connected to a third terminal of the switch tube via the atomization pin; and the first pin is the atomization pin, and the second pin is the power pin; or alternatively, the first pin is the power pin, and the second pin is the atomization pin.

2. The control assembly according to claim 1, wherein the two electrode terminals of the battery module are disposed at a first side and a second side of the battery module, and the two terminals of the first lead are disposed at the first side and the second side of the battery module; wherein, the first side and the second side are disposed at two opposite sides of the battery module.

3. The control assembly according to claim 1, wherein
the control assembly further comprises an auxiliary plate, and the auxiliary plate comprises a first welding pad and a second welding pad;
wherein, the first pin is connected to the first welding pad, and the first welding pad is connected to one electrode terminal of the battery module by pressure welding; and the second pin is connected to the second welding pad, and the second welding pad is connected to one terminal of the first lead by pressure welding.

4. The control assembly according to claim 3, wherein the first welding pad defines therein a first hole configured to fix the first pin; and the second welding pad defines therein a second hole configured to fix the second pin.

5. The control assembly according to claim 1, wherein
in a case that the first pin is the atomization pin and the second pin is the power pin, the first pin is connected to the first interface via a negative electrode terminal and a positive electrode terminal of the battery module sequentially; and
in a case that the first pin is the power pin and the second pin is the atomization pin, the first pin is connected to the first interface via the positive electrode terminal and the negative electrode terminal of the battery module sequentially.

6. The control assembly according to claim 1, wherein
the control circuit comprises: an airflow sensor, a capacitor, and a control chip; the control chip comprises: a logic controller, a unidirectional conduction tube, a switch tube, a power pin, an atomization pin, and a ground pin;

wherein, the logic controller is connected to a first terminal of the airflow sensor and connected to a first terminal of the switch tube; the logic controller is connected to a first terminal of the capacitor and a negative terminal of the unidirectional conduction tube via the power pin; a positive terminal of the unidirectional conduction tube is connected to a second terminal of the switch tube via the atomization pin; and the logic controller is connected to a third terminal of the switch tube, a second terminal of the airflow sensor, and a second terminal of the capacitor via the ground pin; and wherein, the first pin is the ground pin, and the second pin is the atomization pin; or alternatively, the first pin is the atomization pin, and the second pin is the ground pin.

7. The control assembly according to claim 6, wherein
in a case that the first pin is the ground pin and the second pin is the atomization pin, the first pin is connected to the first interface via a negative electrode terminal and a positive electrode terminal of the battery module sequentially; and
in a case that the first pin is the atomization pin and the second pin is the ground pin, the first pin is connected to the first interface via the positive electrode terminal and the negative electrode terminal of the battery module sequentially.

8. The control assembly according to claim 1, wherein
the switch tube is a P-type metal-oxide semiconductor field effect transistor; and the first terminal of the switch tube is a gate, the second terminal of the switch tube is a source, and the third terminal of the switch tube is a drain;
or alternatively, the switch tube is an N-type metal-oxide semiconductor field effect transistor; and the first terminal of the switch tube is a gate, the second terminal of the switch tube is a drain, and the third terminal of the switch tube is a source.

9. The control assembly according to claim 1, wherein
the capacitor is configured to supply power to the control chip; the airflow sensor is configured to sense an airflow intensity via the second terminal thereof, and output an airflow intensity signal to the logic controller via the first terminal; the logic controller is configured to receive the airflow intensity signal output by the first terminal of the airflow sensor, control an on-off state of switch tube according to the airflow intensity signal, and control a switching frequency and/or an on-duty ratio of the switch tube according to the airflow intensity signal, whereby adjusting a power of the atomization module;
wherein, in a case that a signal intensity of the airflow intensity signal is smaller than a preset value, the logic controller is configured to control the switch tube to be in a cut-off state; and in a case that the signal intensity of the airflow intensity signal is greater than or equal to the preset value, the logic controller is configured to control the switch tube to be in a conducting state.

10. An electronic atomizer, comprising: an atomization module and a control assembly, the control assembly comprising: a control circuit, a battery module, and a first interface and a second interface; the first interface and the second interface being configured to connect the control assembly with the atomization module;

wherein
the battery module is provided with a first lead penetrating therethrough;
the first interface and a first pin of the control circuit are connected to two electrode terminals of the battery module, respectively; and the second interface and a second pin of the control circuit are connected to two terminals of the first lead, respectively;
the first pin is an atomization pin, and the second pin is a power pin; or alternatively, the first pin is the power pin, and the second pin is the atomization pin; or alternatively, the first pin is a ground pin, and the second pin is the atomization pin; or alternatively, the first pin is the atomization pin, and the second pin is the ground pin;
the control circuit comprises: an airflow sensor, a capacitor, and a control chip; the control chip comprises: a logic controller, a unidirectional conduction tube, a switch tube, a power pin, an atomization pin, and a ground pin;
the logic controller is connected to a first terminal of the airflow sensor and connected to a first terminal of the switch tube; the logic controller is connected to a first terminal of the capacitor and a second terminal of the switch tube via the power pin; the logic controller is connected to a positive terminal of the unidirectional conduction tube, a second terminal of the airflow sensor, and a second terminal of the capacitor via the ground pin; and a negative terminal of the unidirectional conduction tube is connected to a third terminal of the switch tube via the atomization pin;
the first pin is the atomization pin, and the second pin is the power pin; or alternatively, the first pin is the power pin, and the second pin is the atomization pin; and
the control assembly is connected to one terminal of the atomization module via the first interface, and the control assembly is connected to another terminal of the atomization module via the second interface.

11. A battery module, comprising: a casing, a battery core, and a first lead; wherein, the battery core and the first lead are independently arranged inside the casing, and a first terminal and a second terminal of the first lead are arranged at different sides of the casing, respectively;
wherein, a first electrode terminal of the battery core is configured to be connected with a first pin of an external control circuit, and a second electrode terminal of the battery core is configured to be connected with a first terminal of an external load module; the first terminal of the first lead is configured to be connected with a second pin of the control circuit, and the second terminal of the first lead is configured to be connected with another terminal of the external load module; and the control circuit is configured to control the battery module and the external load module to form a current pathway to achieve a first function;
wherein, the external load module is an atomization module, and the first function is an electronic atomization function;
wherein in a case that the first electrode terminal of the battery core is a negative electrode terminal and the second electrode terminal of the battery core is a positive electrode terminal, the first pin is an atomization pin, and the second pin is a power pin; or alternatively, in a case that the first electrode terminal of the battery core is the positive electrode terminal and the second electrode terminal of the battery core is the negative electrode terminal, the first pin is the power pin and the second pin is the atomization pin; or alternatively, in a case that the first electrode terminal of the battery core is the negative electrode terminal and the second electrode terminal of the battery core is the positive electrode terminal, the first pin is a ground pin and the second pin is the atomization pin; or alternatively, in a case that the first electrode terminal of the battery core is the positive electrode terminal and the second electrode terminal of the battery core is the negative electrode terminal, the first pin is the atomization pin and the second pin is the ground pin;
wherein, the first pin is the atomization pin, and the second pin is the power pin; or alternatively, the first pin is the power pin, and the second pin is the atomization pin; and
wherein, the control circuit comprises: an airflow sensor, a capacitor, and a control chip; the control chip comprises: a logic controller, a unidirectional conduction tube, a switch tube, the power pin, the atomization pin, and the ground pin; wherein, the logic controller is connected to a first terminal of the airflow sensor and connected to a first terminal of the switch tube; the logic controller is connected to a first terminal of the capacitor and a second terminal of the switch tube via the power pin; the logic controller is connected to a positive terminal of the unidirectional conduction tube, a second terminal of the airflow sensor, and a second terminal of the capacitor via the ground pin; and a negative terminal of the unidirectional conduction tube is connected to a third terminal of the switch tube via the atomization pin.

* * * * *